United States Patent
Yamaguchi et al.

(10) Patent No.: US 10,887,504 B2
(45) Date of Patent: Jan. 5, 2021

(54) DISTANCE MEASUREMENT DEVICE AND DISTANCE MEASUREMENT METHOD

(71) Applicant: HITACHI, LTD., Tokyo (JP)

(72) Inventors: Keita Yamaguchi, Tokyo (JP); Yusuke Nakamura, Tokyo (JP)

(73) Assignee: HITACHI, LTD., Tokyo (JP)

( * ) Notice: Subject to any disclaimer, the term of this patent is extended or adjusted under 35 U.S.C. 154(b) by 67 days.

(21) Appl. No.: 16/192,874

(22) Filed: Nov. 16, 2018

(65) Prior Publication Data

US 2019/0182430 A1 Jun. 13, 2019

(30) Foreign Application Priority Data

Dec. 11, 2017 (JP) ................................ 2017-236633

(51) Int. Cl.
*H04N 5/232* (2006.01)
*G02F 1/1343* (2006.01)

(52) U.S. Cl.
CPC . *H04N 5/232122* (2018.08); *G02F 1/134309* (2013.01); *H04N 5/232125* (2018.08); *H04N 5/232939* (2018.08); *G02F 2201/122* (2013.01)

(58) Field of Classification Search
CPC ....... H04N 5/232122; H04N 5/232125; H04N 5/232939; G02F 1/134309; G02F 2201/122
See application file for complete search history.

(56) References Cited

U.S. PATENT DOCUMENTS

2018/0136480 A1* 5/2018 Shimano ................ H04N 5/335

FOREIGN PATENT DOCUMENTS

WO 2017/149687 A1 9/2017

* cited by examiner

*Primary Examiner* — Twyler L Haskins
*Assistant Examiner* — Fayez Bhuiyan
(74) *Attorney, Agent, or Firm* — Mattingly & Malur PC

(57) ABSTRACT

A distance measurement device is characterized in that the device includes: an image sensor configured to convert light to electrical signals to generate a sensor image; a modulator configured to modulate the intensity of light projected on the image sensor, based on a pattern for shooting; a complex information generating unit configured to generate, from the sensor image, complex information including a complex number; an evaluation index array generating unit configured to generate an evaluation index array, based on phase information of the complex information; and a distance information generating unit configured to generate distance information, based on the evaluation index array.

18 Claims, 46 Drawing Sheets

PROJECTION IMAGE OF PATTERN 105 FOR SHOOTING

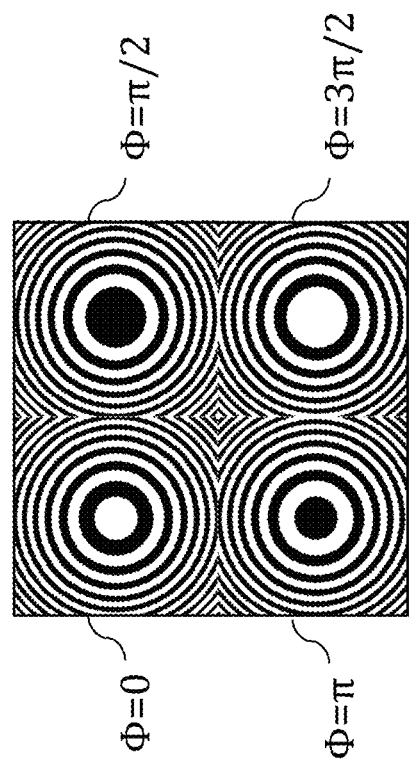

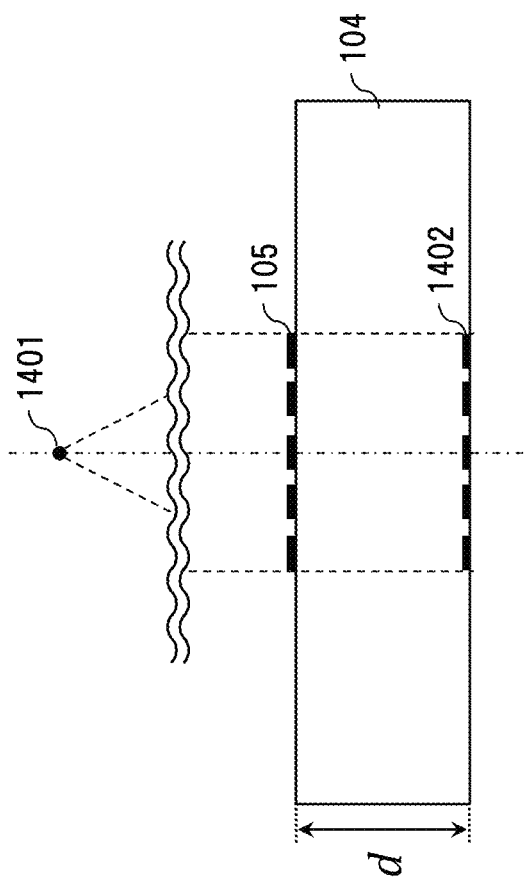

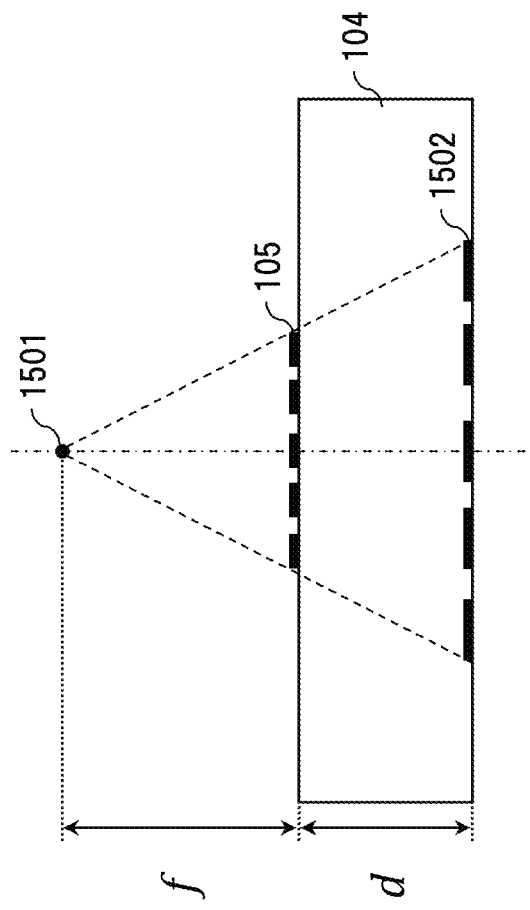

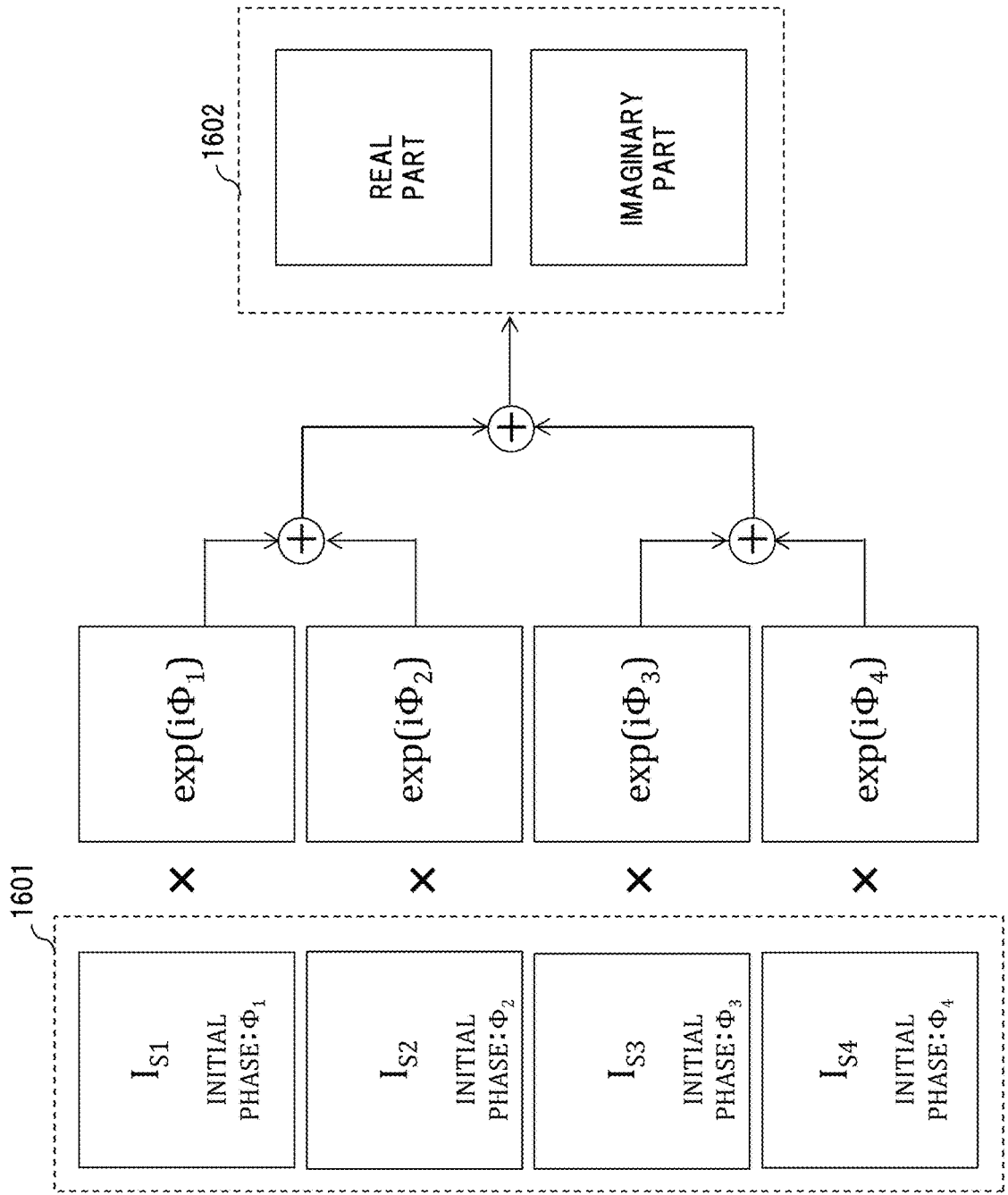

FIG.22 COMPLEX INFORMATION 1602
REAL PART
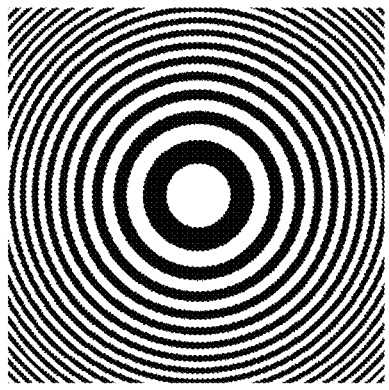
IMAGINARY PART
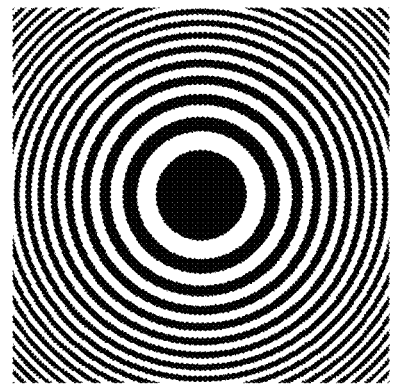

FIG.23
PATTERN 1801 FOR EVALUATION INDEX ARRAY GENERATION
$\beta' = > \beta_0$
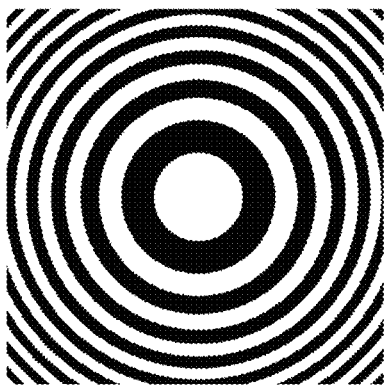
REAL PART
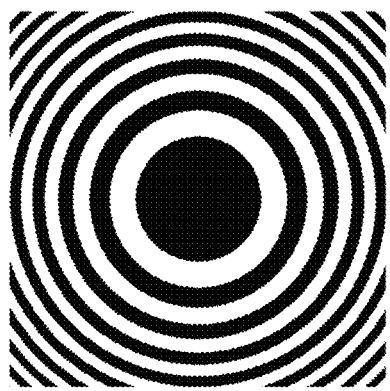
IMAGINARY PART
$\beta' = \beta_0$
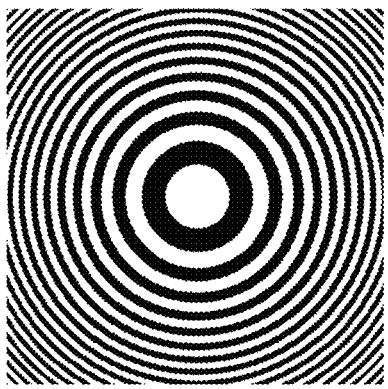
REAL PART
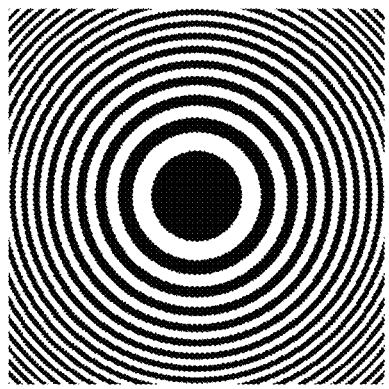
IMAGINARY PART
$\beta' = < \beta_0$
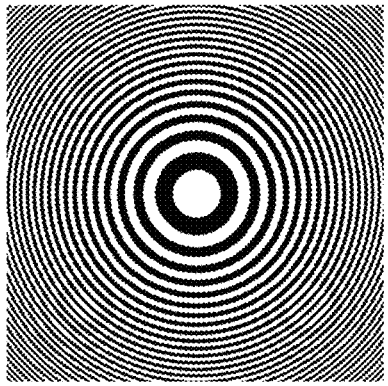
REAL PART
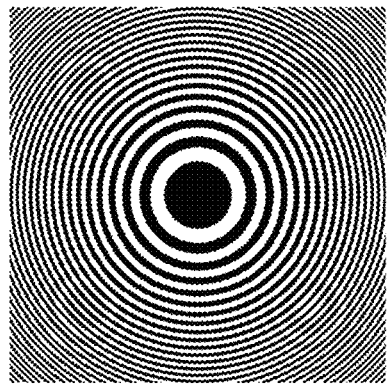
IMAGINARY PART

β' = β0

$\beta' = 1.002 \times \beta 0$

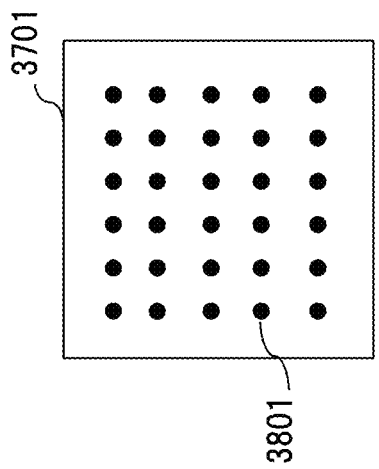

DISTANCE MEASUREMENT DEVICE AND DISTANCE MEASUREMENT METHOD

This application claims the priority based on the Japanese Patent Application No. 2017-236633 filed on Dec. 11, 2017. The entire contents of which are incorporated herein by reference for all purpose.

BACKGROUND

Technical Field

The present invention relates to a distance measurement device and a distance measurement method.

Related Art

The international publication No. WO2017/149687 discloses, as a configuration for achieving a high-function imaging device which performs focusing after shooting (refocusing), auto focus, ranging, and the like, "an imaging device including: an image sensor configured to convert an optical image captured in a plurality of pixels arranged in an array form at an imaging surface, to image signals, and outputs the image signals; a modulator provided on a light-receiving surface of the image sensor and configured to modulate the intensity of light; an image storage unit configured to temporarily store image signals output from the image sensor; and a signal processing unit configured to apply image processing to image signals output from the image storage unit, characterized in that the modulator has a first grating pattern composed of multiple concentric circles, and the signal processing unit modulates the image signals output from the image sensor in accordance with a second grating pattern composed of multiple concentric circles, thereby generating a moire fringe image".

SUMMARY

The imaging device described in the international publication No. WO2017/149687 extracts distance information, based on how the contrast of an imaging result is high or low, in order to make a distance measurement. However, the configuration of the imaging device may be affected by a blurred shape in defocus, thereby causing a significant error in distance information.

The present invention has been made in view of the foregoing circumstance, and an object of the invention is to make it possible to generate accurate distance information in a distance measurement operation of an imaging device or the like.

The present application encompasses more than one means for solving at least part of the problem mentioned above, and an example of the means will be given as follows. In order to solve the problem mentioned above, a distance measurement device according to an aspect of the present invention includes: an image sensor configured to convert light to electrical signals to generate a sensor image; a modulator configured to modulate the intensity of light projected on the image sensor, based on a pattern for shooting; a complex information generating unit configured to generate, from the sensor image, complex information including a complex number; an evaluation index array generating unit configured to generate an evaluation index array, based on phase information of the complex information; and a distance information generating unit configured to generate distance information, based on the evaluation index array.

According to the present invention, accurate distance information can be generated. Objects, configurations, and advantageous effects other than the foregoing will be evident from the following description of embodiments.

BRIEF DESCRIPTION OF DRAWINGS

FIG. 18 is a diagram illustrating an example of a pattern for shooting;

FIG. 19 is a diagram illustrating the projection of a pattern for shooting in the case of an object at infinity;

FIG. 20 is a diagram illustrating the enlargement of a pattern for shooting in the case of an object at a finite distance;

FIG. 21 is a diagram illustrating an example of a method for generating an evaluation index array;

FIG. 22 is a diagram illustrating an example of a complex information pattern;

FIG. 23 is a diagram illustrating examples of a pattern for evaluation index array generation in a distance measurement device;

FIG. 46 is a diagram illustrating an example of an illumination light pattern from a light source for lighting.

DETAILED DESCRIPTION

Figure 1:
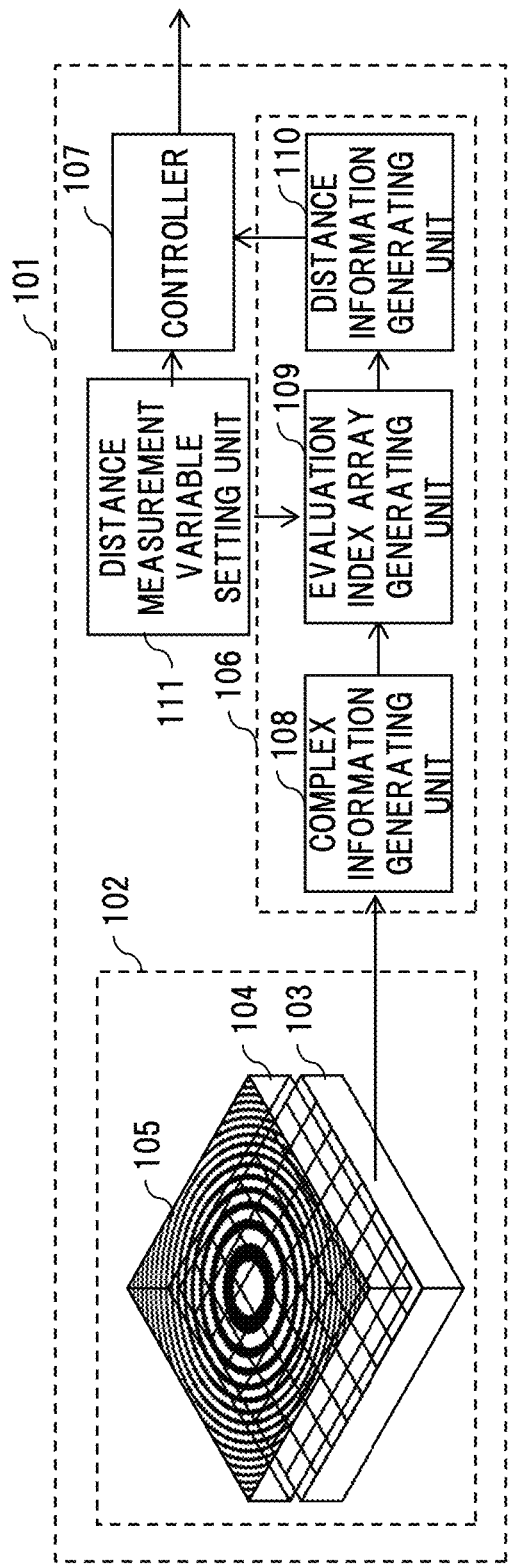
FIG. 1 is a block diagram illustrating a configuration example of a distance measurement device as a first embodiment according to the present invention.

In the respective embodiments described below, explanations will be given which are divided into multiple sections or embodiments, if necessary, for the sake of convenience. However, unless expressly stated otherwise, the sections or embodiments are not to be considered independent of one another, but one section or embodiment has a relation partially or entirely with the other, such as modification examples, details, and supplemental explanations. In addition, in the respective embodiments, in the case of referring to the numbers (including numbers, numerical values, amounts, ranges, and the like) of elements, the numbers are not to be considered limited to any specific number, unless expressly stated otherwise, and unless obviously limited to the specific numbers in principle, but may be the specific numbers or more, or less.

Furthermore, in the respective embodiments, obviously, the constituent elements (also including elemental steps) are not necessarily to be considered indispensable, unless expressly stated otherwise, and unless considered obviously indispensable in principle. Likewise, in the respective embodiments, in the case of referring to the shapes, positional relationship, and the like of the constituent elements, the shapes and the like are considered including equivalents substantially approximate or similar to the shapes and the like, unless expressly stated otherwise, and unless obviously excluded in principle. The same applies to the numerical values and ranges mentioned above. In addition, throughout all of the drawings for the explanation of the respective embodiments, the same members are denoted by the same reference numerals in principle, and repeated descriptions thereof will be omitted.

Embodiments of the present invention will be described below with reference to the drawings.

First Embodiment

<Shooting Principle for Object at Infinity>

FIG. 1 shows a configuration example of a distance measurement device 101 as a first embodiment according to the present invention.

The distance measurement device 101 is adapted to capture an image of an external object without using any lens for imaging, and composed of, as shown in FIG. 1, an imaging unit 102, an image processing unit 106, a controller 107, and a distance measurement variable setting unit 111.

The image processing unit 106 includes a complex information generating unit 108, an evaluation index array generating unit 109, and a distance information generating unit 110.

Figure 2:
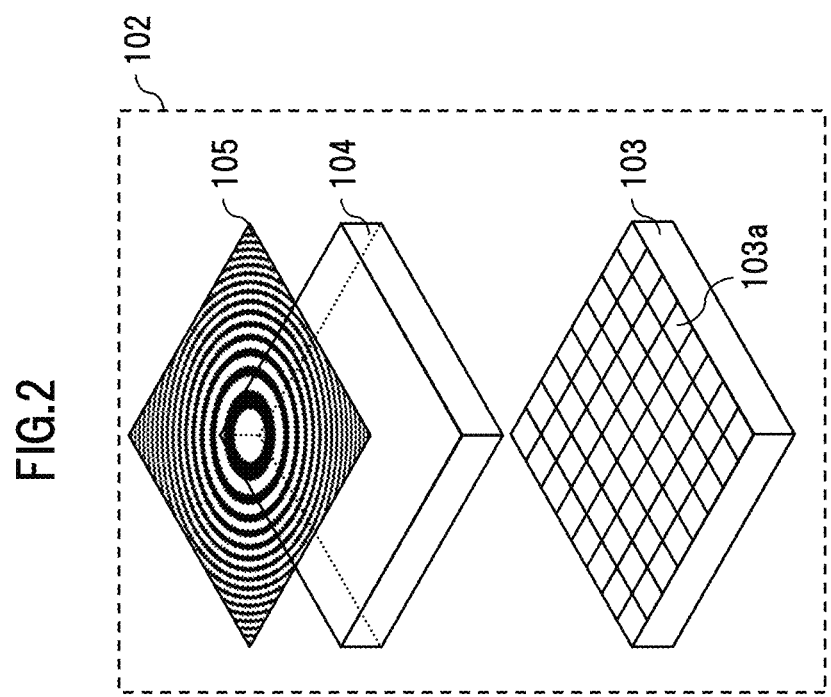
FIG. 2 is a diagram illustrating a configuration example of an imaging unit.

FIG. 2 shows a configuration example of the imaging unit 102. The imaging unit 102 is composed of an image sensor 103, a pattern substrate 104, and a pattern 105 for shooting.

One flat surface of the pattern substrate 104 is fixed in close contact with the light-receiving surface of the image sensor 103, and the pattern 105 for shooting is formed on the other flat surface of the pattern substrate 104. The pattern substrate 104 is made of a material that is transparent to visible light, for example, such as glass or plastics.

The pattern 105 for shooting is formed by vapor deposition of a metal such as aluminum and chromium through, for example, a sputtering method or the like which is used for semiconductor processes. A contrast is formed by a pattern with aluminum or the like vapor-deposited and a pattern without aluminum vapor-deposited.

It is to be noted that the pattern 105 for shooting is not to be considered limited thereto, but for example, the contrast may be formed by any means as long as the means can achieve transmission modulation, such as, for example, by printing or the like with an ink-jet printer or the like. In addition, although visible light has been cited as an example herein, for example, in the case of shooting with far-infrared rays, a material that is transparent to a wavelength intended for shooting, e.g., a material that is transparent to far-infrared rays, for example, such as germanium, silicon, or chalcogenide, may be used for the pattern substrate 104, whereas a material that blocks the wavelength may be used for the pattern 105 for shooting.

Figure 3:
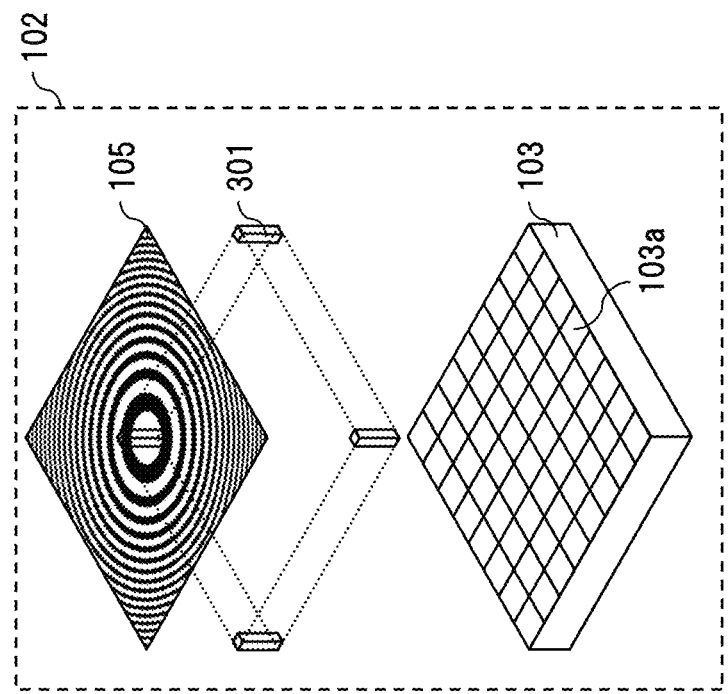
FIG. 3 is a diagram illustrating another configuration example of the imaging unit.

It is to be noted that the method of forming the pattern 105 for shooting on the pattern substrate 104 has been described herein, but the pattern 105 for shooting may be formed as shown in FIG. 3.

FIG. 3 shows another configuration example of the imaging unit 102. The imaging unit 102 in FIG. 3 is adapted to have a pattern 105 for shooting formed in a thin film, and held by supporting members 301. It is to be noted that in the distance measurement device 101, the angle of view for shooting can be changed depending on the thickness of the pattern substrate 104. Therefore, for example, as long as the pattern substrate 104 has the configuration of FIG. 3 and has the function of being capable of changing the lengths of the supporting members 301, it is also possible to change the angle of view for shooting at the time of shooting.

The surface of the image sensor 103 has pixels 103a as light-receiving elements arranged regularly in a grid-like form. This image sensor 103 converts optical images received by the pixels 103a to image signals as electrical signals. The image signals output from the image sensor 103 are subjected to image processing, and then output by the image processing unit 106 as an image processing unit.

In the foregoing configuration, in the case of shooting, the light intensity of light that passes through the pattern 105 for shooting is modulated by the pattern, and the passing light is received by the image sensor 103. The image signals output from the image sensor 103 have data subjected to image processing by the image processing unit 106, and the data subjected to the image processing is output to the controller 107. In the case of outputting the output of the image processing unit 106 to a host computer or an external recording medium, the controller 107 convers the data format so as to fit into an interface such as a USB, and outputs the data.

Subsequently, the principle of image shooting in the distance measurement device 101 will be described. First, the pattern 105 for shooting is a concentric pattern with a pitch made fine in inverse proportion to the radius from the center. In this regard, the pattern 105 for shooting is defined as in the following formula (1) with the use of a radius r from the reference coordinate as the center of the concentric circle and a coefficient R.

[Mathematical Formula 1]

$$I(r)=1+\cos \beta r^2 \quad (1)$$

The pattern 105 for shooting shall be subjected to transmission modulation in proportion to the formula (1).

Figure 4:
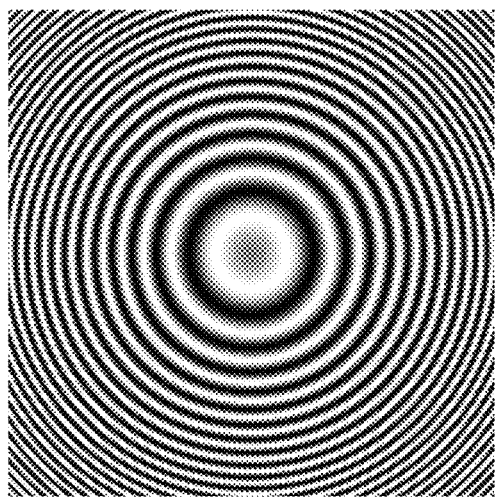
FIG. 4 is a diagram illustrating an example of a pattern for shooting or a pattern for development.
Figure 5:
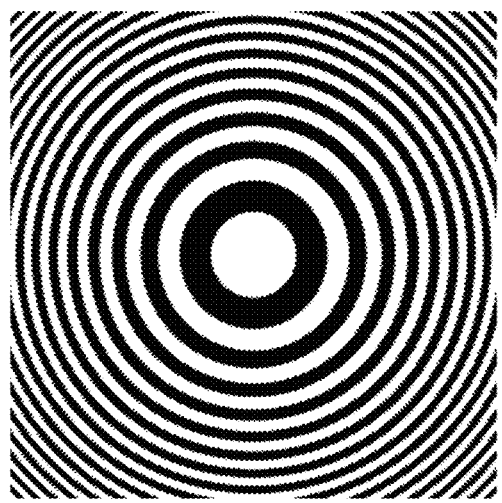
FIG. 5 is a diagram illustrating an example of a pattern for shooting or a pattern for development.

The plate with such a fringe as in the pattern 105 for shooting is referred to as Gabor Zone Plate or Fresnel Zone Plate. FIG. 4 shows an example of Gabor Zone Plate in accordance with the formula (1), and FIG. 5 shows an example of Fresnel Zone Plate obtained by binarizing the formula (1) with a threshold value 1.

It is to be noted that hereinafter, for the sake of simplification, an explanation for only the x-axis direction will be given with mathematical formulas, but also considering the y-axis direction as well makes it possible to see two-dimensional deployment.

Figure 6:
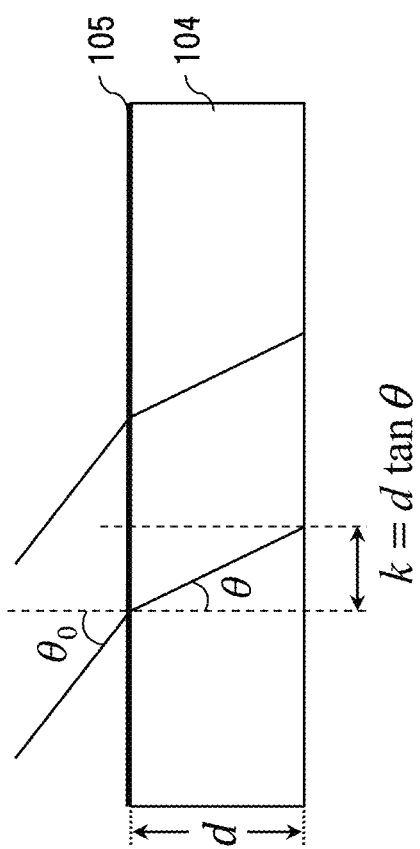
FIG. 6 is a diagram for explaining an in-plane shift produced for a projection image from a pattern substrate surface to an image sensor with oblique incident parallel light.

Assume that parallel light enters at an angle $\theta_0$ in the x-axis direction as shown in FIG. 6 onto the pattern substrate 104 of d in thickness with the pattern 105 for shooting formed. In a geometric optical manner, where the refraction angle in the substrate 104 is denoted by θ, light multiplied by the transmission of the grating at the surface enters the image sensor 103, just with a k=d·tan θ shift. In this case, a projection image with an intensity distribution as represented by the following formula (2) is detected on the image sensor 103.

[Mathematical Formula 2]

$$I_F(x)=1+\cos [\beta(x+k)^2+\Phi] \quad (2)$$

It is to be noted that Φ represents an initial phase of a transmission distribution in accordance with the formula (1). This projection image of the pattern 105 for shooting is projected, with a k shift, as in the formula (2). This image corresponds to the output of the imaging unit 102.

Figure 7:
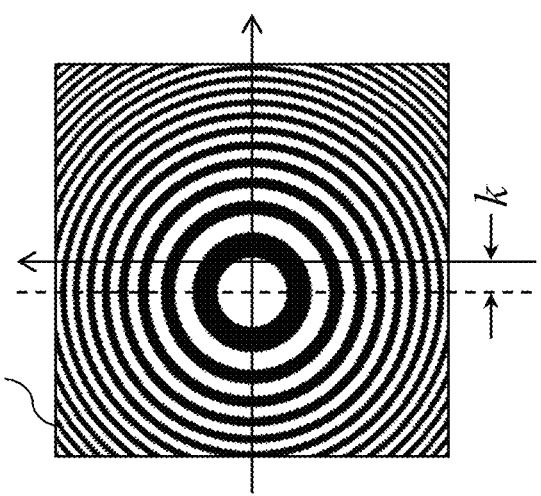
FIG. 7 is a diagram illustrating a projection image of an example of a pattern for shooting.
Figure 8:
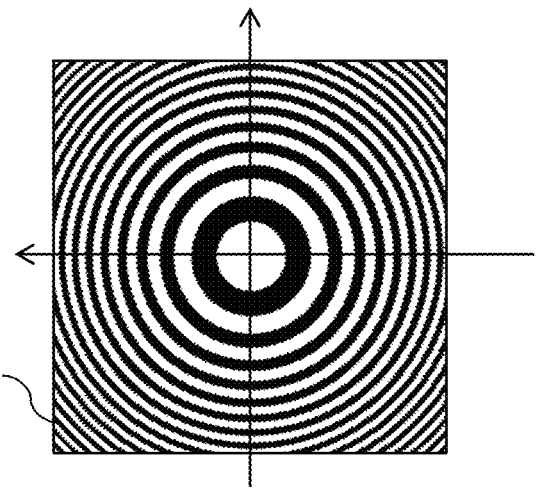
FIG. 8 is a diagram illustrating an example of a pattern for development.
Figure 9:
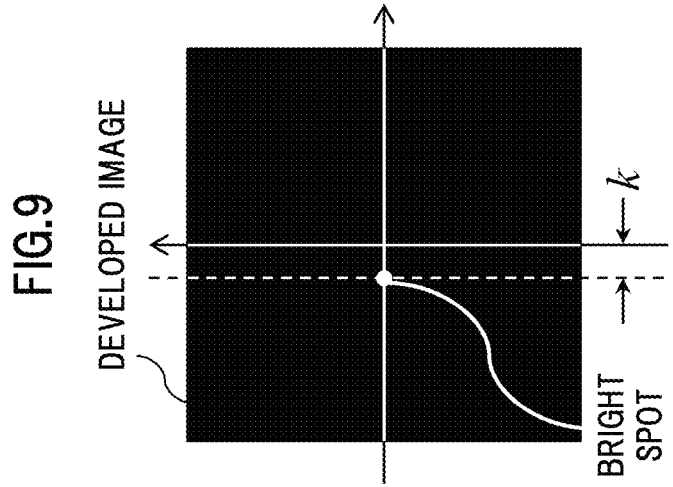
FIG. 9 is a diagram illustrating an example of an image developed by a correlation development method.

For the development of the shot image, a cross-correlation function between the projection image (FIG. 7) of the pattern 105 for shooting and a pattern 801 for development (FIG. 8) is computed, thereby providing a bright spot with a shift amount of "k" (FIG. 9).

It is to be noted that typically, the operation quantity will be increased if the cross-correlation operation is performed in accordance with a two-dimensional convolution operation. Thus, the principle of an operation example through the use of Fourier transform which requires a small operation quantity will be described with reference to mathematical formulas.

First, Gabor Zone Plate or Fresnel Zone Plate is used for the pattern 801 for development as well as the pattern 105 for shooting, and the pattern 801 for development can be thus expressed as in the following formula (3) with the use of the initial phase Φ.

[Mathematical Formula 3]

$$I_B(x)=\cos(\beta x^2+\Phi) \quad (3)$$

The pattern 801 for development is used in image processing that is executed by the image processing unit 106, and thus not required to be offset with 1 as in the formula (1), and may have a negative value without any problem.

The Fourier transform of the formulas (1) and (3) respectively provide results as in the following formulas (4) and (5).

[Mathematical Formula 4]

$$\mathcal{F}[I_F(x)] = \delta(u) + \frac{e^{-iku}}{2\sqrt{\pi\beta}} \sin\left(\frac{u^2}{4\beta} - \Phi + \frac{\pi}{4}\right) \quad (4)$$

[Mathematical Formula 5]

$$\mathcal{F}[I_B(x)] = \frac{1}{2\sqrt{\pi\beta}} \sin\left(\frac{u^2}{4\beta} - \Phi + \frac{\pi}{4}\right) \quad (5)$$

In this regard, F, u, and δ( ) respectively represent a Fourier transform operation, a frequency coordinate in the x direction, and a delta function. What is important for the formulas (4) and (5) is that the Fourier transformed formulas also represent Fresnel Zone Plate or Gabor Zone Plate. Therefore, a Fourier transformed pattern for development may be directly generated on the basis of the formulas (4) and (5). This direct generation makes it possible to reduce the operation quantity.

Next, the multiplication of the formula (4) by the formula (5) provides the following formula (6).

[Mathematical Formula 6]

$$\mathcal{F}[I_F(x)] \cdot \mathcal{F}[I_B(x)] = \frac{1}{2\sqrt{\pi\beta}}\sin\left(\frac{\pi}{4}-\Phi\right)\delta(u) + \frac{e^{-iku}}{8\pi\beta}\cdot\left[\sin^2\left(\frac{u^2}{4\beta}-\Phi+\frac{\pi}{4}\right)\right] \quad (6)$$

The term "exp(−iku)" represented by an exponential function in the formula (6) refers to a signal component, and the Fourier transform of the term provides a result as in the following formula (7), from which a bright spot can be obtained in the location of "k" on the original x axis.

[Mathematical Formula 7]

$$\mathcal{F}^{-1}[e^{-iku}] = 2\pi\delta(x+k) \quad (7)$$

This bright spot indicates a light flux at infinity, which is a shot image from the distance measurement device 101.

It is to be noted that the correlated development method may be achieved with a pattern that is not limited to Fresnel Zone Plate or Gabor Zone Plate, for example, a random pattern, as long as the autocorrelation function of the pattern has a single peak.

<Noise Cancellation>

The above-described transform from the formula (6) to the formula (7) has been described while focusing on the signal component, but in actuality, the term other than the signal component disturbs development, thereby generating noise. Therefore, noise cancellation based on fringe scan is carried out. Specifically, when the multiplication result of the formula (6) is integrated with respect to the initial phase Φ as represented by the following formula (8) through the use of the orthogonality of the trigonometric function, the signal term multiplied by a constant can be left with the noise term cancelled.

[Mathematical Formula 8]

$$\int_0^{2\pi} \mathcal{F}[I_F(x)] \cdot \mathcal{F}[I_B(x)] d\Phi = \frac{1}{4\beta}e^{-iku} \quad (8)$$

Figure 10:
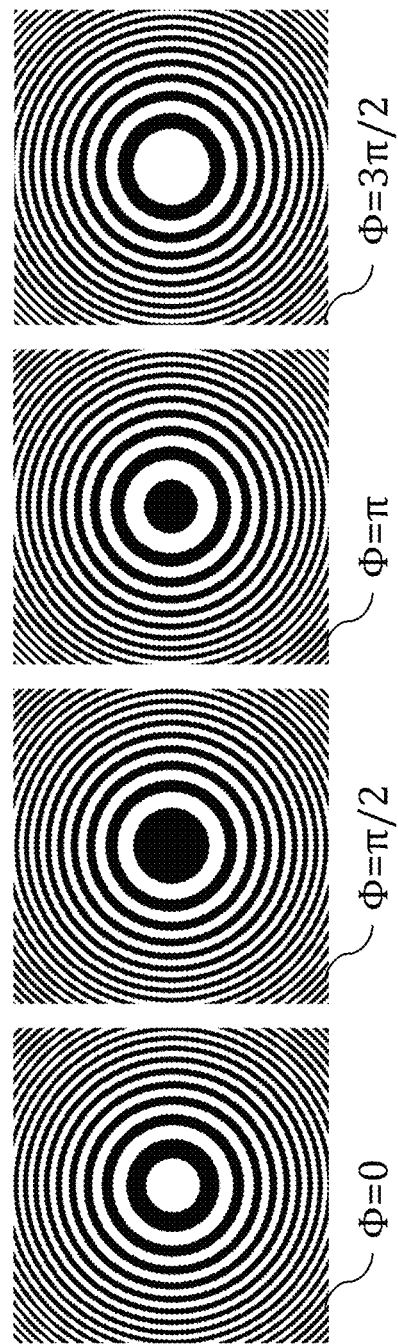
FIG. 10 is a diagram illustrating an example of a combination of initial phases in fringe scan.

It is to be noted that the formula (8) is shown in the form of an integral equation, but in actuality, a similar effect is also achieved by calculating the sum in the combination of multiple types (four types in the case of FIG. 10) of initial phases Φ (Φ=0, Φ=π/2, Φ=π, Φ=3π/2) as shown in FIG. 10. As in the combination, the initial phase Φ may be set so as to divide the angle from 0 to 2π equally.

For the fringe scan described above, there is a need to use, as the pattern 105 for shooting, multiple patterns that differ in initial phase Φ. In order to achieve the use of the multiple patterns, there are a method of switching the pattern in a time-division manner and a method of switching the pattern in a space division manner.

Figure 11:
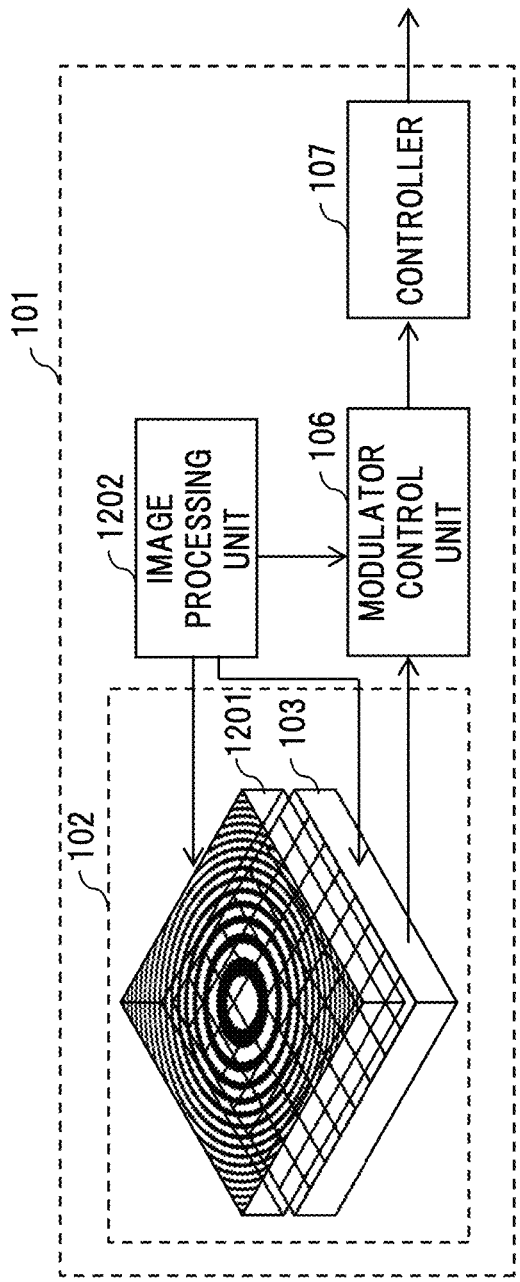
FIG. 11 is a diagram illustrating a configuration example of a distance measurement device in the case of time-division fringe scan.

FIG. 11 shows therein the configuration of the distance measurement device 101 in the case of achieving the fringe scan by switching the pattern in a time-division manner. A liquid crystal display element capable of electrically switching and displaying the multiple phases Φ shown in FIG. 10 may be used as a pattern 1201 for shooting. The switching timing of the liquid crystal display element and the shutter timing of the image sensor 103 are controlled in synchronization by a modulator control unit 1202, thereby acquiring four images, and thereafter, the fringe scan operation is performed.

Figure 12:
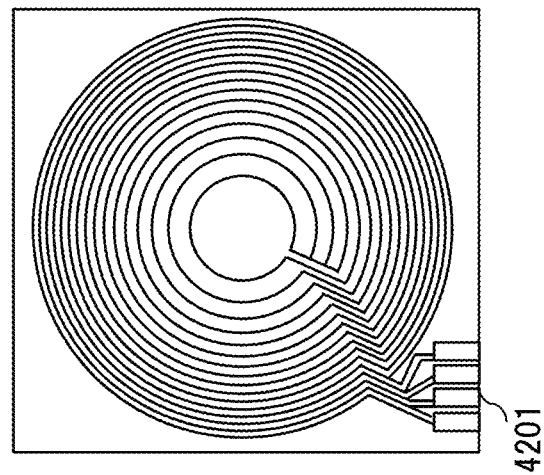
FIG. 12 is a diagram illustrating an example of a transparent electrode in a liquid crystal display element.
Figure 13:
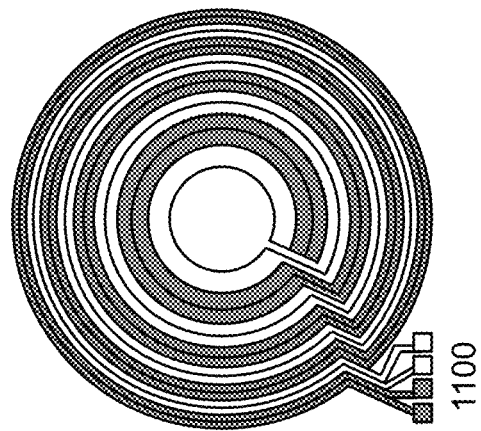
FIG. 13 is a diagram illustrating an example of a voltage application pattern for a transparent electrode in a liquid crystal display element.
Figure 14:
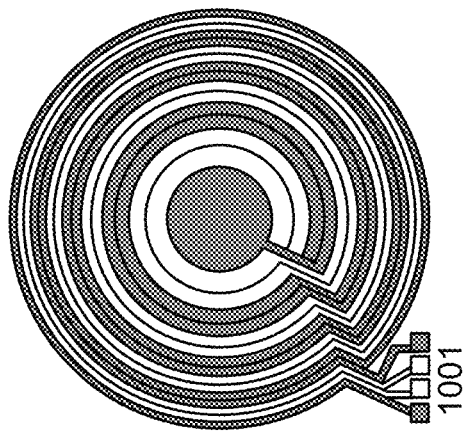
FIG. 14 is a diagram illustrating an example of a voltage application pattern for a transparent electrode in a liquid crystal display element.
Figure 15:
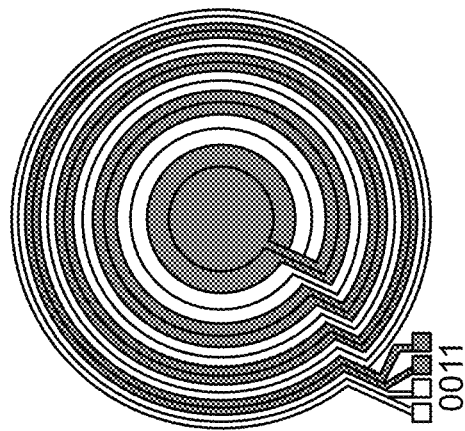
FIG. 15 is a diagram illustrating an example of a voltage application pattern for a transparent electrode in a liquid crystal display element.
Figure 16:
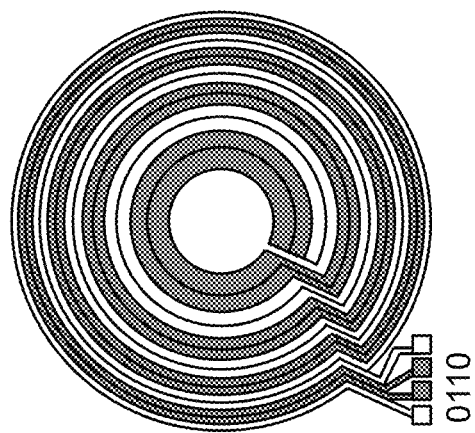
FIG. 16 is a diagram illustrating an example of a voltage application pattern for a transparent electrode in a liquid crystal display element.

Further, in the case of performing the fringe scan with the use of the liquid crystal display element, electrodes that drive the liquid crystal display element may be configured, for example, as shown in FIG. 12. The electrodes are composed of concentric transparent electrodes so as to divide one period of the pattern 105 for shooting into four, and the connection to an outside electrode every four electrodes from the inside eventually delivers four electrodes as a driving terminal for the electrodes at a terminal part 4201. It is to be noted that one period of the pattern 150 for shooting corresponds to a set of white circular ring and black circular ring (or black circle) adjacent to each other in the pattern for shooting, shown in FIG. 4. In order to actually make the initial phase variable through the application of a predetermined voltage to the electrodes, the voltages applied to the four electrodes are temporally switched between two states of "0" and "1", thereby displaying a mode with the initial phase Φ=0 as shown in FIG. 13, a mode with the initial phase Φ=π/2 as shown in FIG. 14, a mode with the initial phase Φ=π as shown in FIG. 15, and a mode with the initial phase Φ=3π/2 as shown in FIG. 16, and then changing the light transmission in the liquid crystal display element.

Figure 17:
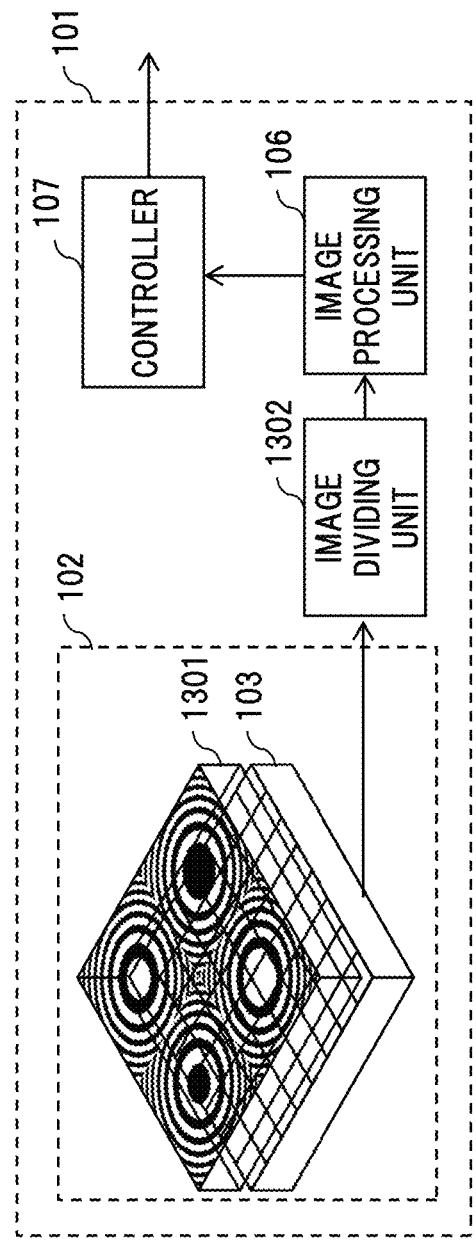
FIG. 17 is a diagram illustrating a configuration example of a distance measurement device in the case of space division fringe scan.
Figure 24:
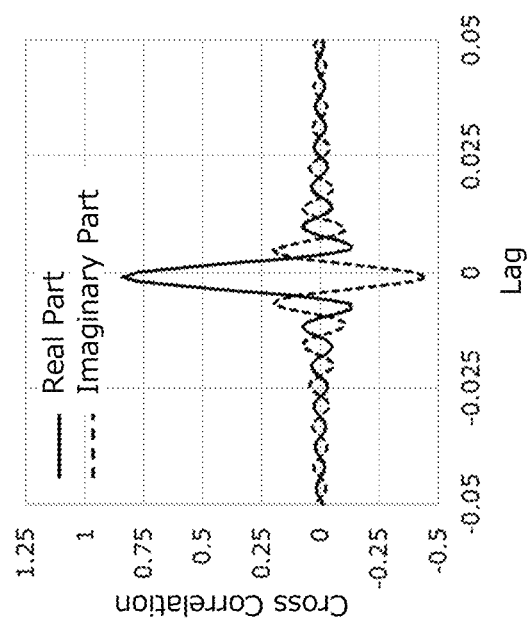
FIG. 24 is a diagram showing an example of a profile of an evaluation index array.
Figure 25:
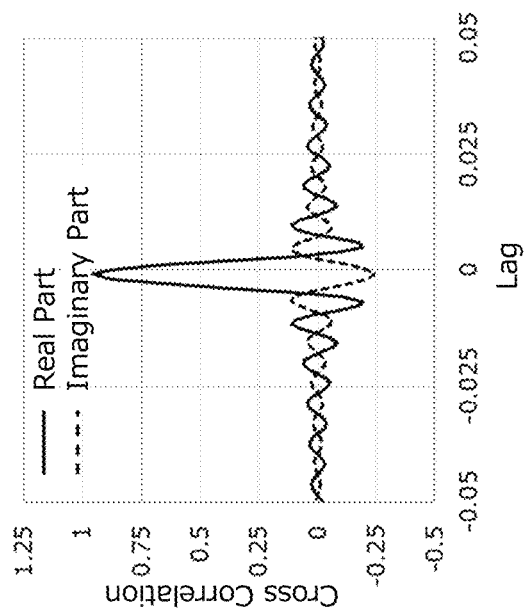
FIG. 25 is a diagram showing an example of a profile of an evaluation index array.
Figure 26:
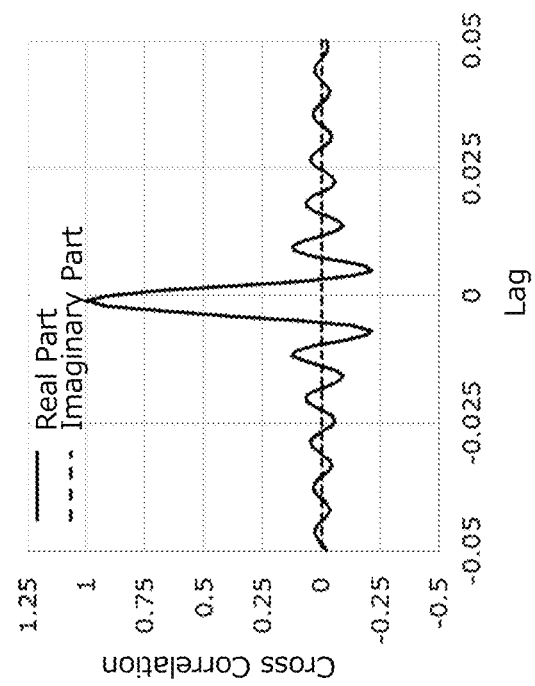
FIG. 26 is a diagram showing an example of a profile of an evaluation index array.
Figure 27:
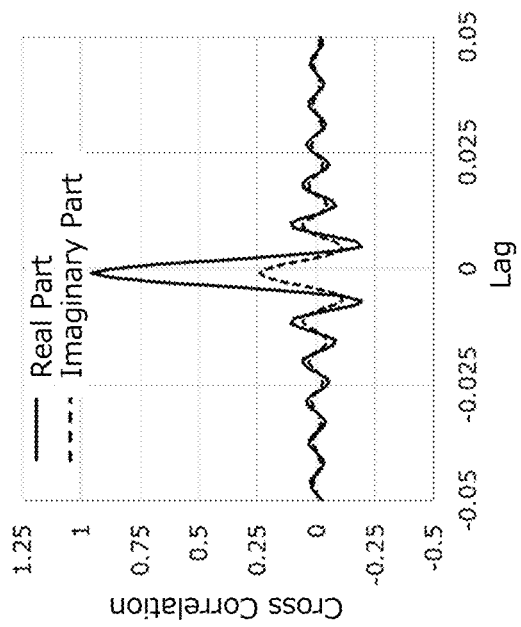
FIG. 27 is a diagram showing an example of a profile of an evaluation index array.
Figure 28:
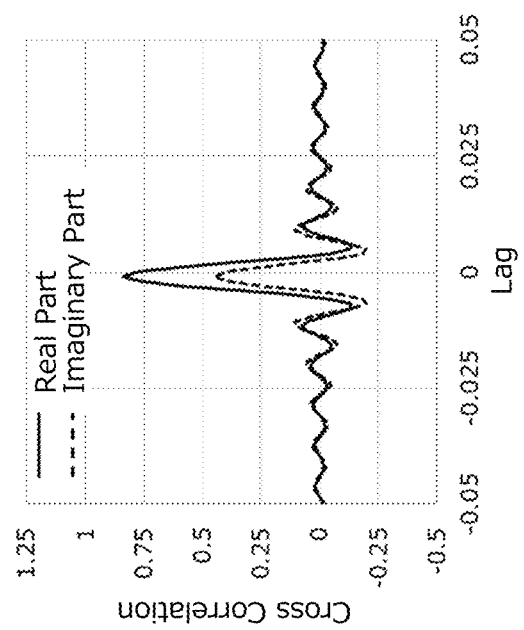
FIG. 28 is a diagram showing an example of a profile of an evaluation index array.

In contrast, FIG. 17 shows therein the configuration of the distance measurement device 101 in the case of achieving the fringe scan by switching the pattern in a space division manner. As a pattern 1301 for shooting, the pattern 1301 for shooting may be used, which has multiple initial phases as shown in FIG. 18. In this regard, one image is acquired, and then divided into four to correspond to patterns at the respective initial phases in an image dividing unit 1302, and thereafter, the fringe scan operation is performed.

<Distance Measurement Principle>

Next, FIG. 19 shows the projection of the pattern 105 for shooting to the image sensor 103 in the case of the thus described subject in the distance. The spherical wave from a point 1401 constituting an object in the distance turns into a plane wave while propagating over a sufficiently long distance, the plane wave irradiates the pattern 105 for shooting, and in a case in which the projection image 1402 is projected to the image sensor 103, the projection image has almost the same phase as the pattern 105 for shooting. Therefore, the projection image 1402 is subjected to the processing for development with the use of the pattern for development, thereby making it possible to obtain a single bright spot.

Next, FIG. 20 shows the projection of the pattern 105 for shooting to the image sensor 103, which is enlarged by the pattern 105 for shooting, in the case of an object to be imaged at a finite distance. The spherical wave from a point 1501 constituting the object irradiates the pattern 105 for shooting, and in a case in which the projection image 1502 is projected to the image sensor 103, the projection image is enlarged in an almost uniform manner. Further, the size ratio α between the projection image and the pattern for shooting can be calculated as in the following formula (9) with the use of the distance f from the pattern 105 for shooting to the point 1501.

[Mathematical Formula 9]

$$\alpha = \frac{f+d}{f} \quad (9)$$

Therefore, the processing for development directly with the use of the pattern for development, designed for parallel light, fails to develop any tack-sharp image. As long as the pattern 801 for development is multiplied for enlargement by the coefficient β' shown in the following formula (10) in accordance with the uniformly enlarged projection image of the pattern 105 for shooting, it is possible to develop a tack-sharp image.

[Mathematical Formula 10]

$$\beta' = \frac{\beta}{\alpha^2} \quad (10)$$

Therefore, the enlargement factor $\alpha^2$ for the pattern 801 for development, which can reproduce a tack-sharp image at the time of development, is obtained, thereby making it possible to measure the distance to the subject to be subjected to shooting.

While a lens focal point method that makes a distance measurement based on a blurred image shot by a normal camera extracts distance information mainly by calculating a point of focus at which the contrast of the image is increased, the point spread function has, in the distance measurement device 101, a Sinc function-type shape that vibrates positively and negatively, rather than a Gaussian function-type shape as in the case of a normal camera. For this reason, the method of extracting distance information simply on the basis of the contrast of the image increases the error included in the extracted distance information, thereby failing to make a distance measurement with a high degree of accuracy.

Therefore, the distance measurement device 101 is adapted to obtain the enlargement factor $\alpha^2$ for the tack-sharp pattern for development with the use of an evaluation index that is different from the developed image contrast, and extract distance information on the basis of the enlargement factor $\alpha^2$.

A distance measurement method implemented with the distance measurement device 101 configured as described above will be described. In the distance measurement device 101, a sensor image (image signals) generated in the image sensor 103 is supplied to the image processing unit 106, which generates distance information in accordance with predetermined image processing. It is to be noted that in the configuration shown in FIG. 11 for the case of performing time-division fringe scan, the modulator control unit 1202 displays the pattern 1201 for shooting while switching the multiple initial phases Φ shown in FIG. 10, thereby shooting four images, and supplies the four sensor images to the image processing unit 106.

On the other hand, in the configuration shown in FIG. 17 for the case of performing space division fringe scan, the image dividing unit 1302 divides one sensor image into four areas, and then generates sensor images shot at the multiple initial phases Φ shown in FIG. 10, and thereafter, supplies the sensor images to the image processing unit 106.

In the image processing unit 106, the complex information generating unit 108, the evaluation index array generating unit 109, and the distance information generating unit 110 each sequentially executed predetermined processing. That is to say, the complex information generating unit 108 generates generate complex information 1602, based on four sensor images 1601 output by the image sensor 103.

FIG. 21 shows a method of generating the complex information 1602 by the complex information generating unit 108. The four sensor images are respectively referred to as $I_{s1}$, $I_{s2}$, $I_{s3}$, and $I_{s4}$, and the initial phases for the pattern 105 for shooting, which correspond to the respective sensor images, are referred to as $\Phi_1$, $\Phi_2$, $\Phi_3$, and $\Phi_4$. Then, as represented by the following formula (11), the results of multiplying the respective sensor images respectively by $\exp(i\Phi_1)$, $\exp(i\Phi_2)$, $\exp(i\Phi_3)$, and $\exp(i\Phi_4)$ are added to generate the complex information 1602.

[Mathematical Formula 11]

$$C(x) = I_{s1} \exp(i\phi_1) + I_{s2} \exp(i\phi_2) + I_{s3} \exp(i\phi_3) + I_{s4} \exp(i\phi_4) \quad (11)$$

Next, the evaluation index array generating unit 109 generates an evaluation index array 1603 based on the complex information 1602. The method for generating the evaluation index array 1603 will be described with reference to FIGS. 22 to 29.

In a case in which a subject 1901 is a point light source, the complex information 1602 is, for example, information composed of a real part and an imaginary part as shown in FIG. 22.

In a case in which the pitch coefficient in the case of enlarging the pattern 105 for shooting at the enlargement factor $\alpha^2$ is denoted by β', the evaluation index array generating unit 109 performs a cross-correlation operation with a pattern 1801 for evaluation index array generation and the complex information 1602 while changing β' (β'≥β0, β'=β0, β'≤β0) as shown in FIG. 23. FIGS. 24 to 28 show examples of the cross-correlation operation result.

In this regard, the coefficient β0 refers to a coefficient of the projection image of the pattern for shooting, projected to the sensor images 1601. From this result, it should be noted that the imaginary component of the cross-correlation operation result, indicated by a dashed line, becomes 0 in a case in which the coefficient β' coincides with the coefficient β0, and the amplification of the imaginary component is increased as the difference between the coefficients is increased. Therefore, searching the coefficient β' with which the imaginary component becomes 0 is regarded as processing in the distance information generating unit 110 described later.

Then, the evaluation index array generating unit 109 stores and outputs the absolute value of the imaginary part of the cross-correlation operation result depending on the coefficient β' in and from the evaluation index array 1603. In addition, the evaluation index array 1603 may have a shooting range divided into pixels with any resolution and then held as shown in FIG. 29.

Figure 29:
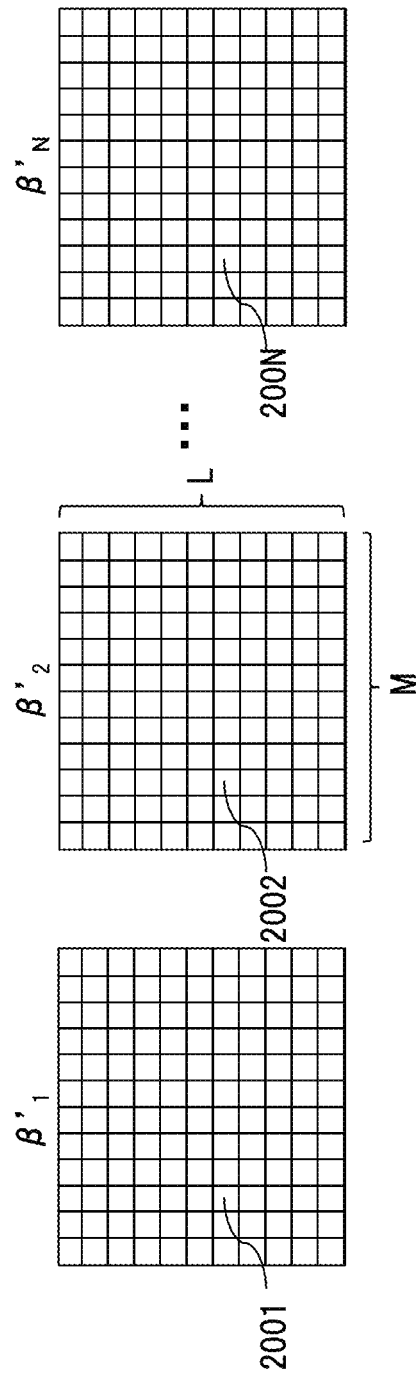
FIG. 29 is a diagram illustrating an example of an evaluation index array.

It is to be noted that in a case in which the division number of pixels and the number of coefficients β' used for the cross-correlation operation are respectively denoted by L×M and N, the evaluation index array 1603 has a three-dimensional array composed of N two-dimensional arrays of L×M that are generated by an operation with the use of the coefficients β'$_1$, β'$_2$, . . . , and β'$_N$ of N patterns 1801 for evaluation index array generation, as shown in FIG. 29.

Finally, the distance information generating unit 110 generates distance information 2901 based on the evaluation index array 1603 output by the evaluation index array generating unit 109. As described previously, the evaluation index array 1603 becomes 0 in a case in which the coefficient β' coincides with the coefficient β0, but sometimes does not become 0 in the case of general subjects.

Figure 30:
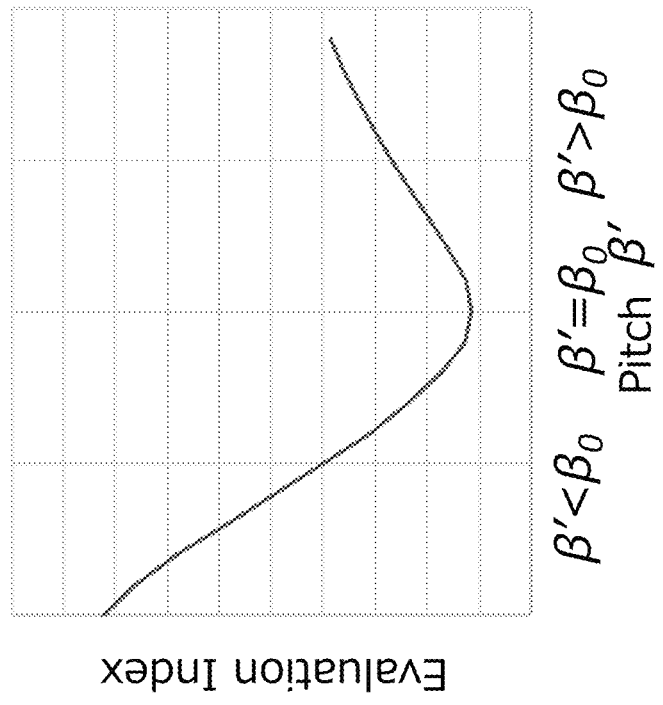
FIG. 30 is a diagram illustrating an example in which the value of an array element of an evaluation index array changes depending on the pitch of a pattern for evaluation index array generation.

FIG. 30 shows the dependence of an element of the evaluation index array 1603 on the coefficient β'. The figure is created by extracting (l, m)-th array elements 2001 to 200N respectively from the N arrays of L×M shown in FIG. 29, and plotting the N array elements.

From FIG. 30, it can be understood that due to the influence of surrounding factors, the array element of the evaluation index array 1603 does not become 0, but represents a minimum value under the condition of $\beta'=\beta 0$. As just described, the enlargement factor $\alpha^2$ that satisfies the formula (10) can be obtained from the coefficient $\beta'$ at the point at which the array element of the evaluation index array 1603 represents a minimum value, and the distance f to the subject 1901 can be calculated from the formula (9).

Figure 31:
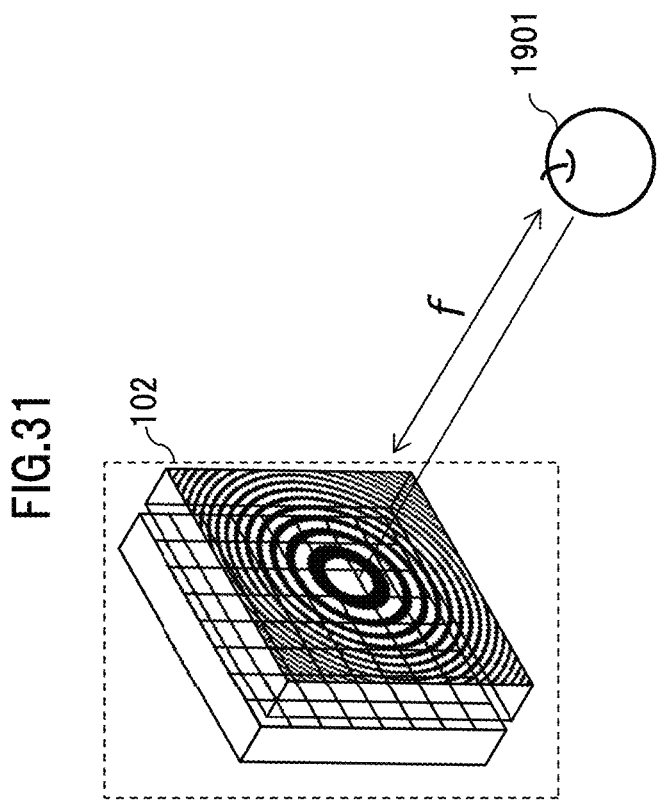
FIG. 31 is a diagram illustrating an example of distance measurement.
Figure 32:
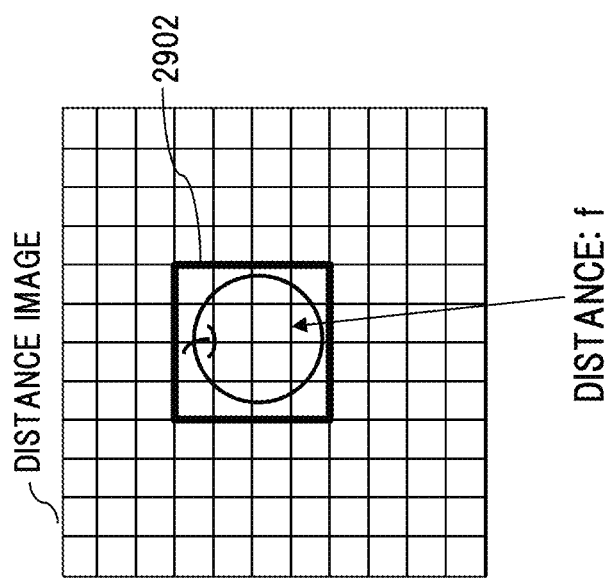
FIG. 32 is a diagram illustrating an example of a distance image of distance information subjected to a data conversion.

The controller 107 applies a data conversion depending on the intended use to the distance information 2901 output by the distance information generating unit 110, and then outputs the information subjected to the data conversion. For example, in the case of generating the distance information 2901 based on a sensor image obtained by taking a shot of the subject 1901 and displaying a distance image on a display as shown in FIG. 31, the distance information 2901 is subjected to a data conversion to a distance image as in FIG. 32, and then output. In this case, of the distance image in FIG. 32, distance information in an area 2902 corresponding to the subject 1901 is output as the distance f to the subject. It is to be noted that as shown in FIG. 32, the controller 107 may output, as the output distance image, an overlap between the distance information 2901 and a normal image obtained by taking a shot of a subject to be subjected to shooting. In addition, in the case of using the distance information 2901 for the control of a mechanical device, the manipulated variable for the achievement of an intended controlled variable may be calculated from the distance information 2901, and the calculated manipulated variable may be output. In addition, a distance measurement variable may be input to the distance measurement variable setting unit 111 via a user interface, and depending on the input variable, the data format of the data output from the controlled 107 may be changed.

Figure 33:
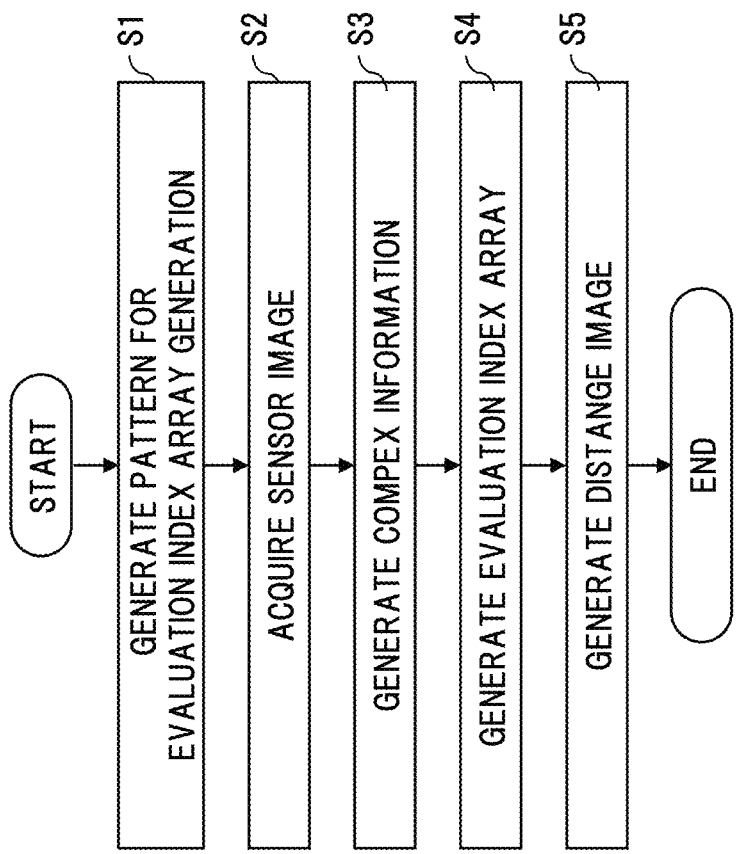
FIG. 33 is a flowchart for explaining an example of distance measurement processing.

Next, FIG. 33 shows a flowchart for explaining an example of distance measurement processing executed by the distance measurement device 101. When the distance measurement processing is started, first, in a step S1, N patters 1801 for evaluation index array generation are generated which differ in $\beta'$. Next, in a step S2, sensor images 1601 are acquired by the image sensor 103. Thereafter, in a step S3, complex information 1602 is generated, based on the sensor images 1601 acquired in the step S2.

Next, in a step S4, a cross-correlation operation with the complex information 1602 generated in the step S3 and the patterns 1801 for evaluation index array generation, generated in the step S1, is performed, thereby generating evaluation index arrays 1603. This cross-correlation operation is performed with the multiple patterns 1801 for evaluation index array generation, generated in the step S1, and the evaluation index arrays 1603 are thus generated as a three-dimensional array as shown in FIG. 29. Finally, in a step S5, based on the multiple evaluation index arrays 1603 generated in the step S4, distance information 2901 is generated, the distance information 2901 is output to the controller 107, and the distance measurement processing is ended.

Figure 34:
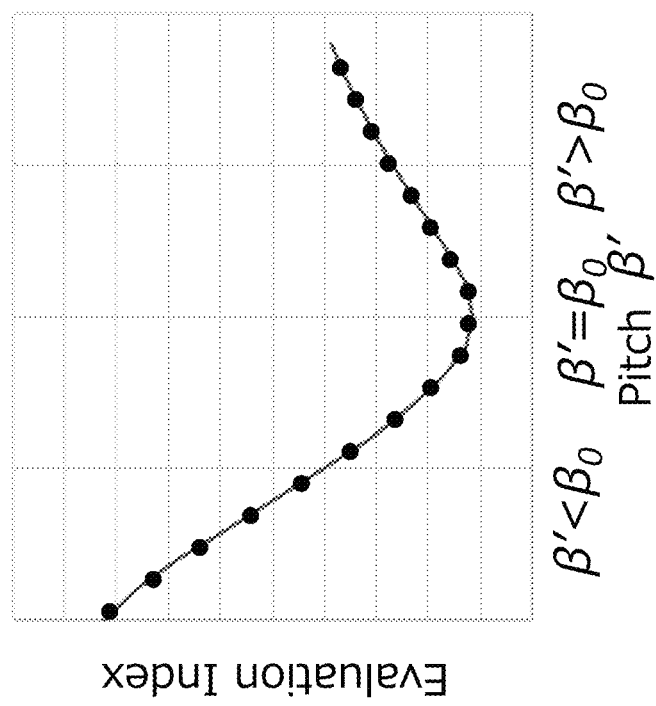
FIG. 34 is a diagram showing an example of sampling an evaluation index array.

It is to be noted that since the values for the array element of the evaluation index array 1603 as shown by the curve in FIG. 30 are sampled at the same number of N sampling points as the number of the N patterns 1801 for evaluation index array generation, generated in the step S1, the value of the evaluation index is determined discretely with respect to $\beta'$ as shown by black points in FIG. 34. In the step S5, the coefficient $\beta'$ with which the evaluation index is minimized may be searched from among the N coefficients $\beta'$ at which the sampling is performed. In addition, the number of data points in FIG. 28 may be subjected to curve fitting or interpolation processing, thereby enhancing the accuracy of the distance information 2901.

Figure 35:
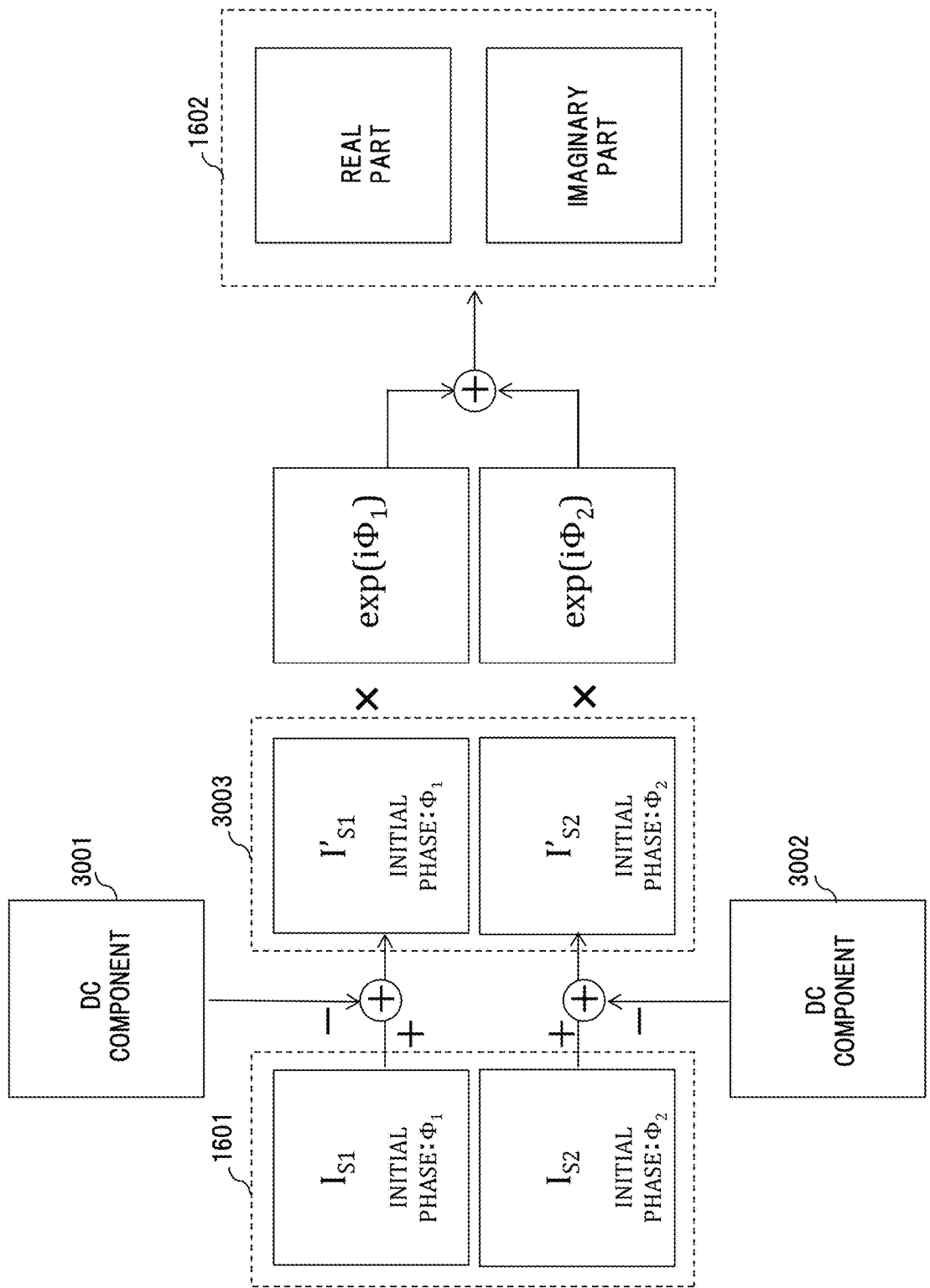
FIG. 35 is a diagram illustrating an example of a method for generating an evaluation index array.

It is to be noted that although the four images are used as the sensor images 1601 in the above description, the distance measurement can be made as long as there are at least two images as shown in FIG. 35. In this case, for example, the complex information generating unit 108 removes, from two sensor images 1601, DC components 3001 and 3002 of the respective images to generate sensor images 3003, and thereafter, generates complex information 1602. The DC components 3001 and 3002 may be removed, for example, by offset removal of the average luminance for the sensor images 1601, or by removing a low-frequency component through the application of high-pass filtering to the image sensors 1601.

The distance measurement made from two sensor images 1601 makes it possible to reduce the time taken for acquiring sensor images in the case of time-division fringe scan. In addition, in the case of space division fringe scan, the reduced division number of a sensor image improves the resolution of the divided sensor images, thereby making it possible to increase the resolution of the distance information 2901.

It is to be noted that the distance measurement may be made from three sensor images 1601, or noise may be further reduced through the use of five or more sensor images.

The distance information generating unit 110 may smooth the evaluation index array 1603 through the calculation of the average value for the multiple array elements or the average value for the absolute values, and then generate distance information 2901, thereby improving the distance measurement accuracy. Alternatively, smoothing may be achieved by, for example, performing a convolution operation with a smoothing filter such as a Gaussian function and the evaluation index array 1603, instead of calculating the average value for the average index array 1603. This smoothing can improve the resolution in the shot surface while keeping the accuracy of the distance information 2901 from being degraded.

In addition, the coefficient $\beta'$ which minimizes the absolute value of the imaginary part of the cross-correlation operation result is obtained in the above description, but for example, for the evaluation index array 1603, the ratio between the absolute value of the imaginary part of the cross-correlation operation result and the absolute value of the real part thereof may be used as an index for the generation of the distance information 2901. In this case, the distance information 2901 can be generated on the basis of the coefficient $\beta'$ which maximizes or minimizes the array element of the evaluation index array 1603.

Alternatively, instead of the absolute value of the imaginary part of the cross-correlation operation result, the imaginary part of the cross-correlation operation result may be stored in the evaluation index array 1603. Thus, the array elements of the evaluation index array 1603 have positive and negative values, thereby making it possible to determine, from one array of L×M, positional relationships such as the position of a subject to be subjected to shooting, located in front or behind with respect to the point of focus.

In addition, as for the method for determining the multiple coefficients $\beta'$ for use in the generation of the evaluation index array 1603, based on the distance measurement range and distance measurement resolution input to the distance measurement variable setting unit 111 via a user interface, the evaluation index array generating unit 109 may select $\beta'$, and then determine the number of, and the interval between the sampling points shown in FIG. 34.

Figure 36:
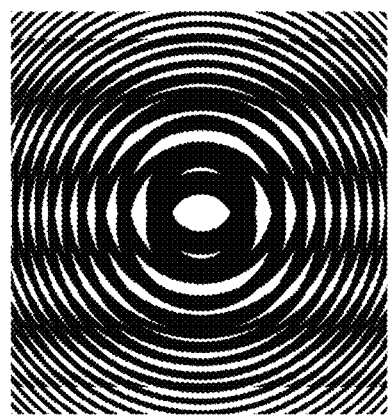
FIG. 36 is a diagram illustrating an example of a moire fringe according to a moire development method.

In addition, the cross-correlation operation with the complex information 1602 and the patterns 1801 for evaluation index array generation is used in the generation of the evaluation index array 1603, but the evaluation index array 1603 may be generated in a way that after the complex information 1602 is multiplied by the patterns 1801 for evaluation index array generation to generate a moire fringe as shown in FIG. 36, the moire fringe is subjected to a Fourier transform.

Figure 37:
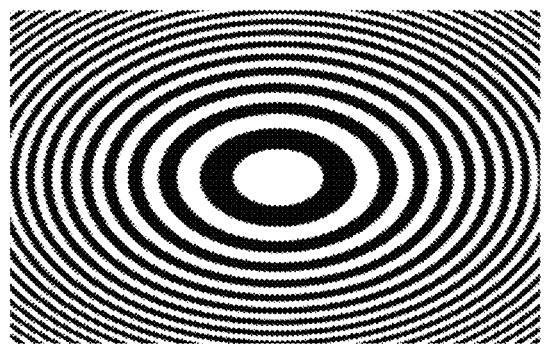
FIG. 37 is a diagram illustrating an example of a pattern for shooting and a pattern for evaluation index array generation.

In addition, the configuration is described which uses the Gabor Zone Plate shown in FIG. 4 or the Fresnel Zone Plate shown in FIG. 5 as the pattern 105 for shooting and the patterns 1801 for evaluation index array generation, but an ellipsoidal pattern as shown in FIG. 37 may be used as the pattern 105 for shooting or the patterns 1801 for evaluation index array generation. The adoption of the foregoing configuration allows, even in a case in which a rectangular sensor is used as the image sensor 103, shooting in accordance with a pattern that has a pitch optimum for the vertical and horizontal sizes and resolution of the sensor, thereby making it possible to optimize the resolution of the distance information 2901. It is to be noted that in the case of performing time-division fringe scan in accordance with an ellipsoidal pattern, the concentric pattern 1201 for shooting, shown in FIG. 11, may be replaced with an ellipsoidal pattern.

Figure 38:
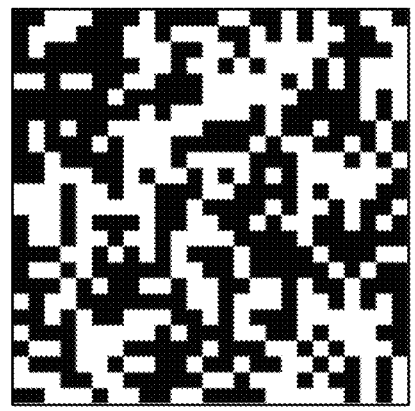
FIG. 38 is a diagram illustrating an example of a pattern for shooting and a pattern for evaluation index array generation.

In addition, a random pattern as shown in FIG. 38 may be used as the pattern 105 for shooting and the patterns 1801 for evaluation index array generation. The adoption of the foregoing configuration allows the patterns 1801 for evaluation index array generation for making the distance measurement to be kept secret, thereby enhancing security.

The configuration and method described above can measure distance information on a subject in the simply configured distance measurement device 101 shown in FIG. 1.

Second Embodiment

Figure 39:
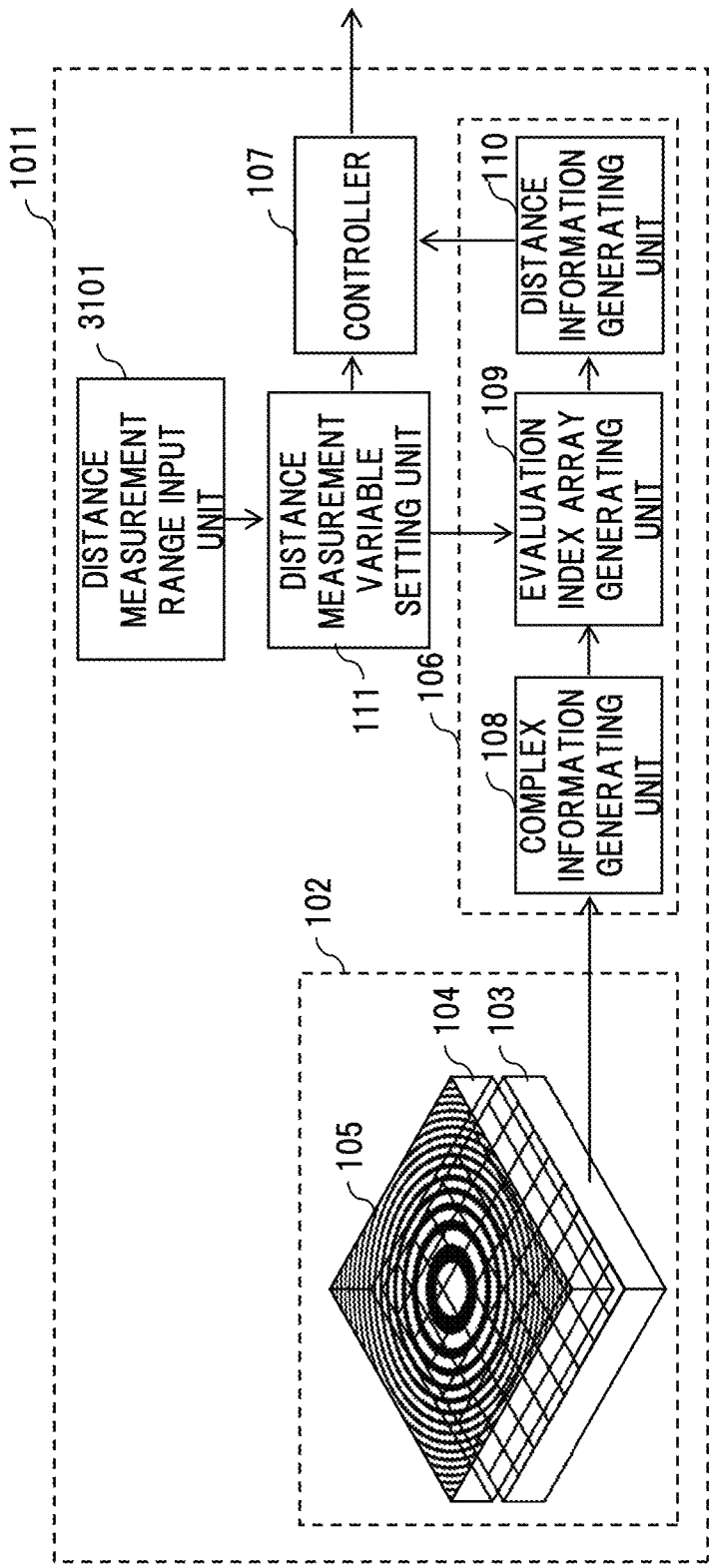
FIG. 39 is a block diagram illustrating a configuration example of a distance measurement device as a second embodiment according to the present invention.

Next, FIG. 39 shows a configuration example of a distance measurement device 1011 as a second embodiment according to the present invention.

The distance measurement device 1011 obtained by adding a distance measurement range input unit 3101 to the distance measurement device 101 (FIG. 1), differs in calculating, in a non-search manner, the coefficient $\beta'$ for a pattern 1801 for evaluation index array generation such that an evaluation index array meets a predetermined requirement.

The distance measurement range input unit 3101 of the distance measurement device 1011 accepts a distance measurement range that is input by a user, and supplies the range to the distance measurement variable setting unit 111. The user inputs the distance measurement range, for example, by specifying the nearest distance $L_N$ and furthest distance $L_F$ of the distance measurement range.

The distance measurement variable setting unit 111 determines, based on the nearest distance $L_N$ and the furthest distance $L_F$, multiple focusing distances for performing an operation for an evaluation index array 1603, and outputs the focusing distances to the evaluation index array generating unit 109. The evaluation index array generating unit 109 selects multiple values for the coefficient $\beta'$ for patterns 1801 for evaluation index array generation for use in the generation of the evaluation index array 1603, based on the multiple focusing distances output by the distance measurement variable setting unit 111.

It is to be noted that the evaluation index array generating unit 109 selects, as $\beta'$ with respect to the focusing distance f, $\beta'$ that satisfies the formulas 9 and 10. Thereafter, the evaluation index array generating unit 109 generates the evaluation index array 1603 from the result of a cross-correlation operation with the patterns 1801 for evaluation index array generation with the selected coefficients $\beta'$ and complex information 1602. The distance information generating unit 110 generates distance information 2901, based on the evaluation index array 1603 output by the evaluation index array generating unit 109.

Figure 40:
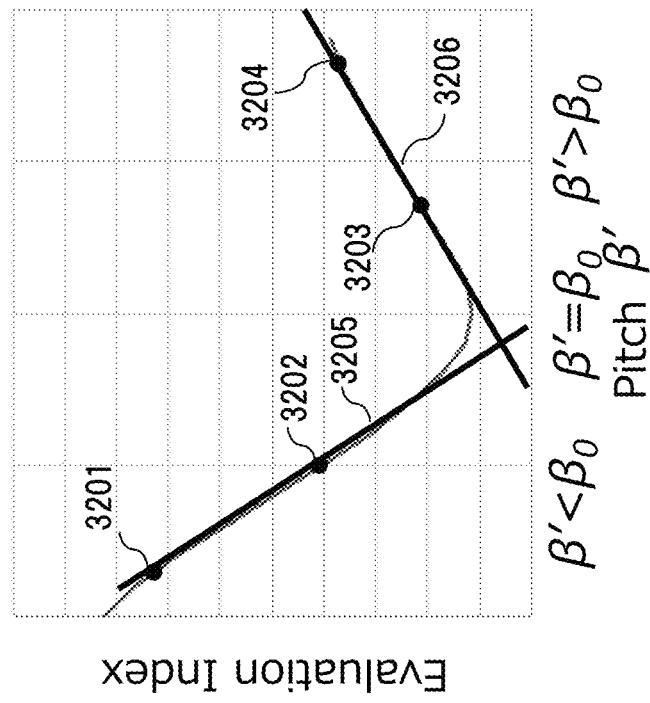
FIG. 40 is a diagram showing an example of sampling an evaluation index array.

Next, FIG. 40 shows the absolute value of an imaginary part of an array element of the evaluation index array 1603, and sampling points.

The distance information generating unit 110 calculates the distance information 2901 from only sampling points 3201 to 3204. The values at the sampling points 3201 and 3202 correspond to the absolute values of imaginary parts from the result of the cross-correlation operation with the pattern 1801 for evaluation index array generation with $\beta'$ for satisfying $f<L_N$ and the complex information 1602, and the values at the sampling points 3203 and 3204 correspond to the absolute values of imaginary parts from the result of the cross-correlation operation with the pattern 1801 for evaluation index array generation with $\beta'$ for satisfying $f>L_F$ and the complex information 1602.

The distance information generating unit 110 calculates, based on the values at the four points, a coefficient $\beta'$ that minimizes the absolute value of the imaginary part of the cross-correlation operation result. For example, the coefficient $\beta'$ that minimizes the absolute value of the imaginary part of the cross-correlation operation result may be derived from calculating a straight line 3205 passing through the sampling points 3201 and 3202 and calculating a straight line 3206 passing through the sampling points 3203 and 3204, and calculating the point of intersection between the straight line 3205 and the straight line 3206, thereby generating the distance information 2901.

Figure 41:
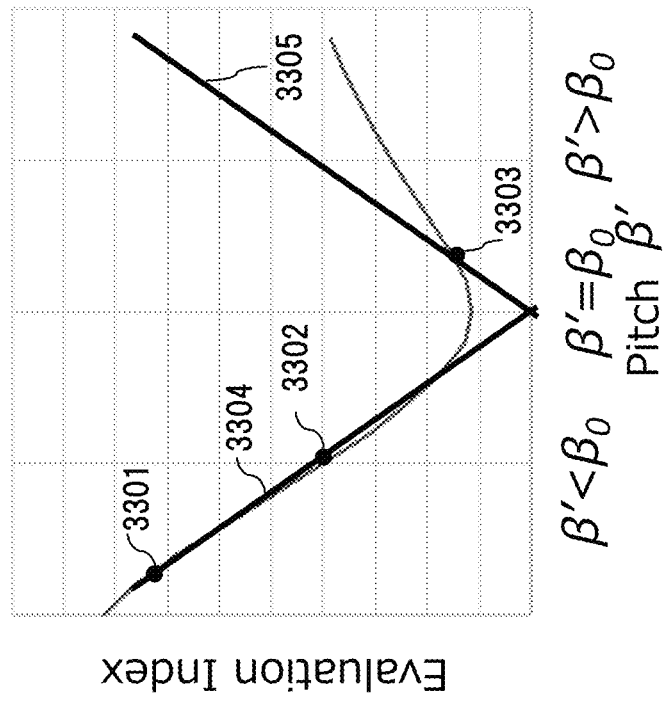
FIG. 41 is a diagram showing an example of sampling an evaluation index array.

Alternatively, the distance information 2901 may be generated from the point of intersection between a straight line 3304 and a straight line 3305 by reducing the number of sampling points to three, calculating the straight line 3304 passing through sampling points 3301 and 3302, and thereafter, calculating the straight line 3305 passing through a sampling point 3303, which has a slope obtained by reversing the sign of the slope of the straight line 3304, as shown in FIG. 41.

Figure 42:
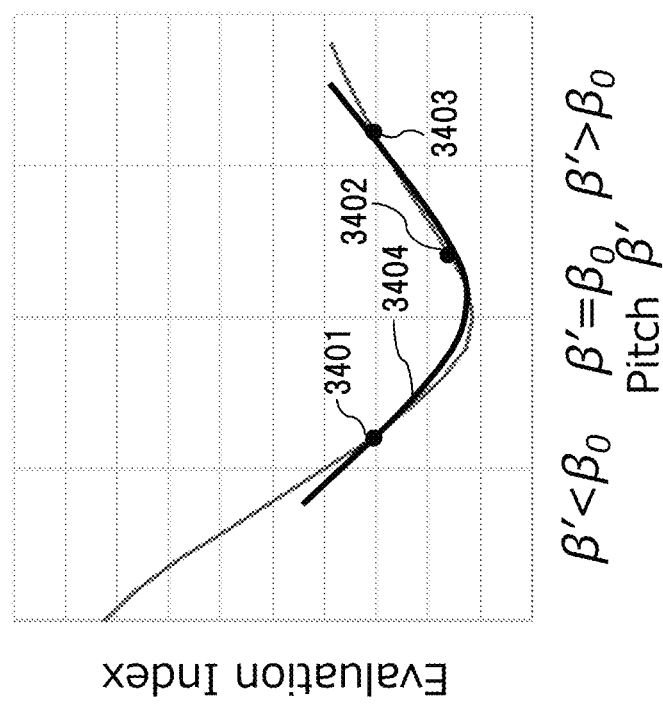
FIG. 42 is a diagram showing an example of sampling an evaluation index array.

Besides the examples described above, the distance information 2901 may be generated in a way that as shown in FIG. 42, after selecting three coefficients $\beta'$ for satisfying $L_N<f<L_F$ in the distance measurement variable setting unit 111, sampling points 3401 to 3403 as evaluation indexes for the three points are subjected to curve fitting with a parabolic curve 3404 in the distance information generating unit 110.

As described above, the distance measurement device 1011 makes it possible to generate distance information at higher speed, although the distance measurement accuracy is decreased as compared with the distance measurement device 101.

It is to be noted that a balance between the speed of distance information generation and an improvement in accuracy may be achieved by generating distance information of low accuracy as in the distance measurement device 1011, and thereafter, generating distance information in a high-accuracy searching manner in a narrow distance measurement range as in the distance measurement device 101.

Third Embodiment

Next, a distance measurement device as a third embodiment according to the present invention will be described. The distance measurement device as the third embodiment is configured in a similar fashion as the distance measurement device 101 (FIG. 1), but different in that distance information is generated on the basis of the phase angle of an evaluation index array.

Figure 43:
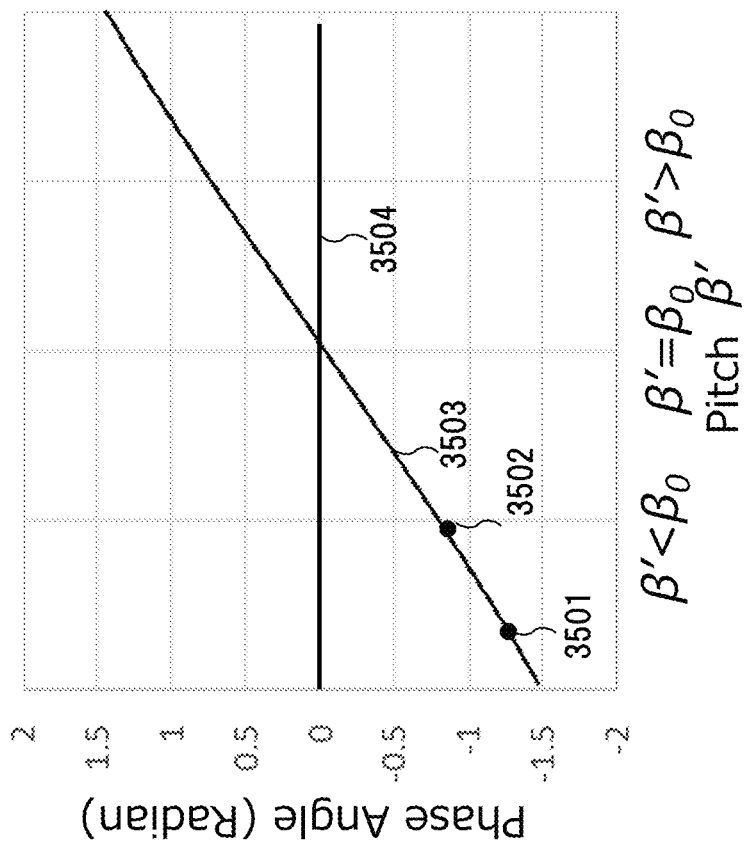
FIG. 43 is a diagram showing an example of sampling an evaluation index array in a distance measurement device as a third embodiment according to the present invention.

FIG. 43 shows the result of plotting a phase angle of the result of a cross-correlation operation with complex information 1602 and a pattern 1801 for evaluation index array generation, with respect to a coefficient β' for the pattern 1801 for evaluation index array generation.

The phase angle changes in a linear manner with respect to the coefficient β', and intersects with 0 at a point of β'=β0. For this reason, in the evaluation index array generating unit 109, based on the result of the cross-correlation operation with the complex information 1602 and the patterns 1801 for evaluation index array generation with any two coefficients β', the evaluation index array 1603 is generated, the phase angles at points 3501 and 3502 are calculated, and a straight line 3503 passing through the two points is calculated. Thereafter, the coefficient β' at which the straight line 3503 intersects with a straight line 3504 at a phase angle of zero is calculated, thereby generating distance information 2901.

As long as the distance information is generated in the way described above, the number of coefficients β' for use in the generation of the patterns 1801 for evaluation index array generation can be reduced down to two, thereby allowing the generation of distance information at high speed.

In addition, the phase angle and the coefficient β' have a linear relationship, thus allowing high-accuracy distance measurements, without causing the degradation of the distance measurement accuracy, which can be problematic in fitting with the use of a small number of sampling points, for example, as in the distance measurement device 1011 described above.

It is to be noted that the distance information generating unit 110 may convert the value of the phase angle to a value that changes in a linear manner with respect to the enlargement factor $\alpha^2$ or the distance f, instead of the pitch coefficient β', and generate the distance information 1901 based on the enlargement factor $\alpha^2$, or directly calculate the distance f, thereby reducing the operation quantity.

Fourth Embodiment

Figure 44:
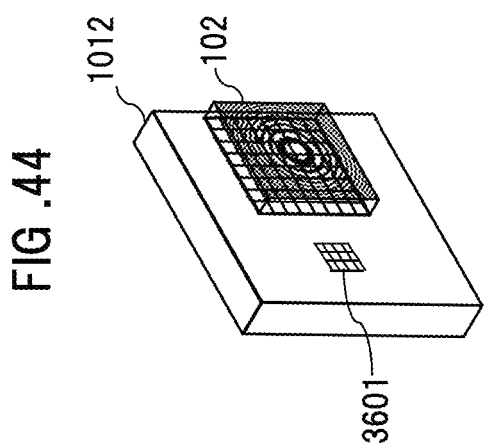
FIG. 44 is a block diagram illustrating a configuration example of a distance measurement device as a fourth embodiment according to the present invention.

Next, FIG. 44 shows a configuration example of a distance measurement device 1012 as a fourth embodiment according to the present invention The distance measurement device 1012 is obtained by adding a supplemental lighting projection unit 3601 to the distance measurement device 101 (FIG. 1).

Figure 45:
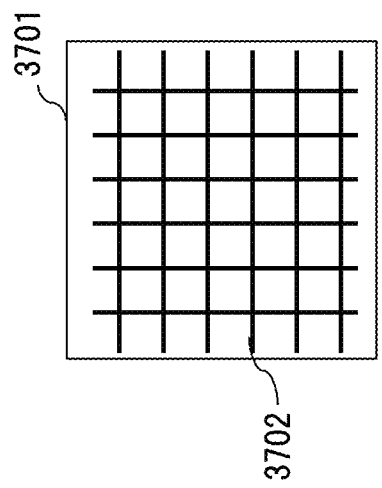
FIG. 45 is a diagram illustrating an example of an illumination light pattern from a supplemental lighting projection unit.

FIG. 45 shows an illumination light pattern 3702 that is delivered by the supplemental lighting projection unit 3601. The supplemental lighting projection unit 3601 delivers, as shown in the figure, structured illumination light composed of the grid-like illumination light pattern 3702 in a shooting area 3701. It is to be noted that the supplemental lighting projection unit 3601 may be adapted to deliver, besides the grid-like illumination light pattern 3702, structured illumination light composed of an illumination light pattern 3801 with dots arranged at regular intervals, as shown in FIG. 46.

In the distance measurement device 1012, the imaging unit 102 shoots the illumination light pattern 3702 (or the illumination light pattern 3801) projected in the shooting area 3701, and based on the shot sensor images, distance information 2901 is generated in the image processing unit 106.

The distance measurement device 1012 adapted to deliver the illumination light pattern 3702 (or the illumination light pattern 3801) can make distance measurements even under conditions such as flat plain surfaces and dark places.

In addition, the roughened texture for use in the generation of the distance information 2901 makes it possible to suppress leakage of a blurring component from a subject disposed in the other pixels in the shooting area 3701, thereby making it possible to reduce errors in the distance information 2901.

It is to be noted that the present invention is not to be considered limited to the respective embodiments described above, but various modifications can be made. For example, the respective embodiment described above have been described in detail for clearly explaining the present invention, but are not necessarily to be considered limited to the inclusion of all of the configurations described. In addition, it is possible to replace a part of a configuration according to an embodiment with a configuration according to another embodiment, and it is possible to add a part of a configuration according to an embodiment to a configuration according to another embodiment.

In addition, the respective configurations, functions, processing units, processing means, etc. mentioned above may be partially or entirely achieved with hardware, for example, by designing with integrated circuits. In addition, the respective configurations, functions, etc. mentioned above may be achieved with software in a way that a processor interprets and executes programs for achieving the respective functions. Information such as programs, tables, and files for achieving the respective functions can be stored on recording devices such as memories, hard disks, SSD (Solid State Drive), or recording media such as IC cards, SD cards, and DVDs.

In addition, the control lines and information lines are shown which are considered required for the sake of explanation, but all of the control lines and information lines required for a product are not always shown. In fact, it is conceivable that almost all of the configurations are interconnected.

What is claimed is:
1. A distance measurement device comprising:
an image sensor configured to convert light to electrical signals to generate a sensor image;
a modulator configured to modulate an intensity of light projected on the image sensor, based on a pattern for shooting;
a complex information generating unit configured to generate, from the sensor image, complex information comprising a complex number;
an evaluation index array generating unit configured to generate an evaluation index array, based on phase information of the complex information; and
a distance information generating unit configured to generate distance information, based on the evaluation index array, wherein the evaluation index array generating unit generates the evaluation index array through a cross-correlation operation with the complex information and a pattern for evaluation, wherein the pattern for evaluation is similar to the pattern for shooting, and the distance information generating unit generates the distance information, based on an enlargement factor for the pattern for evaluation with respect to the pattern for shooting such that the evaluation index array meets a predetermined requirement, and wherein the evaluation index array generating unit generates the multiple evaluation index arrays in accordance with the multiple patterns for evaluation, the patterns being different in the enlargement factor, and the distance information generating unit generates distance information from the multiple evaluation index arrays.

2. The distance measurement device according to claim 1, wherein the pattern for shooting is divided into multiple area patterns, the multiple area pattern are shifted in spatial phase from each other, at least two divided sensor images are generated by dividing the sensor image into areas corresponding to the multiple area patterns, and the complex information is generated, based on the divided sensor images.

3. The distance measurement device according to claim 2, wherein the multiple area patterns are concentric patterns, each with a pitch made fine in inverse proportion to a distance from a reference coordinate.

4. The distance measurement device according to claim 2, wherein the multiple area patterns are ellipsoidal patterns, each with a pitch made fine in inverse proportion to a distance from a reference coordinate, and the multiple ellipsoidal patterns are equal in minimum pitch in a long axis direction and a short axis direction.

5. The distance measurement device according to claim 1, wherein the modulator comprises a liquid crystal display element configured to display the pattern for shooting through a transparent electrode, the transparent electrode changes a transmission of the pattern for shooting, at least two multiple sensor images are acquired by varying the pattern for shooting in phase, and the complex information is generated, based on the multiple sensor images.

6. The distance measurement device according to claim 1, wherein the modulator comprises a liquid crystal display element configured to display the pattern for shooting through a concentric transparent electrode, the transparent electrode divides each period of the pattern for shooting into at least two or more concentric rings to selectively change a light transmission, and the multiple sensor images are acquired by switching, at least once, each of at least two or more voltages applied to the transparent electrode configured to divide each period of the pattern for shooting.

7. The distance measurement device according to claim 1, wherein the modulator comprises a liquid crystal display element configured to display the pattern for shooting through an ellipsoidal transparent electrode, the transparent electrode divides each period of the pattern for shooting into at least two or more ellipsoidal rings to change a light transmission, and the multiple sensor images are acquired by switching, at least once, each of at least two or more voltages applied to the ellipsoidal-ring transparent electrode configured to divide each period of the pattern for shooting.

8. The distance measurement device according to claim 1, wherein the distance information generating unit generates the distance information, based on the enlargement factor such that each array element of the evaluation index array is minimized.

9. The distance measurement device according to claim 1, wherein the distance information generating unit generates the distance information, based on the enlargement factor such that each array element of the evaluation index array is maximized.

10. The distance measurement device according to claim 1, wherein each array element of the evaluation index array is a set of positive or negative numerical values, and the distance information generating unit generates the distance information, based on the enlargement factor such that the respective array elements become zero.

11. The distance measurement device according to claim 1, wherein the evaluation index array comprises an imaginary component from a result of a cross-correlation operation with the complex information and the pattern for evaluation.

12. The distance measurement device according to claim 1, wherein each array element of the evaluation index array changes in proportion to the enlargement factor.

13. The distance measurement device according to claim 1, comprising:

a distance measurement variable setting unit configured to determine a distance measurement range and a distance measurement accuracy depending on a distance to a subject to be subjected to a distance measurement, wherein the evaluation index array generating unit selects the enlargement factor for the multiple patterns for evaluation with respect to the pattern for shooting, based on the distance measurement range and the distance measurement accuracy.

14. The distance measurement device according to claim 1, wherein the evaluation index array generating unit modulates the complex information in accordance with a pattern for evaluation, and applies a Fourier transform to the modulated complex information to generate the evaluation index array.

15. The distance measurement device according to claim 1, comprising:

a supplemental lighting projection unit configured to deliver illumination light.

16. The distance measurement device according to claim 15, wherein the illumination light delivered from the supplemental lighting projection unit is structured illumination light that has a predetermined pattern.

17. A distance measurement method comprising:

modulating an intensity of light projected on an image sensor, based on a pattern for shooting;

converting the light to electrical signals to generate a sensor image;

generating, from the sensor image, complex information comprising a complex number;

generating an evaluation index array, based on phase information of the complex information; and generating distance information, based on the evaluation index array wherein the evaluation index array is generated through a cross-correlation operation with the complex information and a pattern for evaluation, wherein the pattern for evaluation is similar to the pattern for shooting, and the distance information is generated based on an enlargement factor for the pattern for evaluation with respect to the pattern for shooting such that the evaluation index array meets a predetermined requirement, and wherein the multiple evaluation index arrays are generated in accordance with the multiple patterns for evaluation, the patterns being different in the enlargement factor, and the distance information being generated from the multiple evaluation index arrays.

18. The distance measurement method according to claim 17, comprising:

determining a distance measurement range and a distance measurement resolution depending on a distance to a subject to be subjected to a distance measurement; and selecting an enlargement factor for the multiple patterns for evaluation with respect to the pattern for shooting, based on the distance measurement range and the distance measurement resolution.

* * * * *